(12) United States Patent
Hakuta et al.

(10) Patent No.: US 11,654,841 B2
(45) Date of Patent: May 23, 2023

(54) BOX-SHAPED SOUNDPROOF STRUCTURE AND TRANSPORTATION APPARATUS

(71) Applicant: FUJIFILM Corporation, Tokyo (JP)

(72) Inventors: Shinya Hakuta, Ashigara-kami-gun (JP); Shogo Yamazoe, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 338 days.

(21) Appl. No.: 16/829,816

(22) Filed: Mar. 25, 2020

(65) Prior Publication Data

US 2020/0223375 A1 Jul. 16, 2020

Related U.S. Application Data

(63) Continuation of application No. PCT/JP2018/037935, filed on Oct. 11, 2018.

(30) Foreign Application Priority Data

Oct. 11, 2017 (JP) .............................. JP2017-197362
Apr. 18, 2018 (JP) .............................. JP2018-079679

(51) Int. Cl.
*B60R 13/08* (2006.01)
*G10K 11/162* (2006.01)
(Continued)

(52) U.S. Cl.
CPC ........ *B60R 13/0884* (2013.01); *G10K 11/162* (2013.01); *G10K 11/172* (2013.01);
(Continued)

(58) Field of Classification Search
CPC .............................. H04R 5/02; H04R 2499/13
(Continued)

(56) References Cited

U.S. PATENT DOCUMENTS 6,135,834 A * 10/2000 Polakowski ........... B63H 21/32
440/89 R
6,261,140 B1 * 7/2001 Yoshida ................ F01N 13/004
440/89 R
(Continued)

FOREIGN PATENT DOCUMENTS

CN 1317629 A 10/2001
CN 205421582 U 8/2016
(Continued)

OTHER PUBLICATIONS

Japanese Office Action for corresponding Japanese Application No. 2019-548238, dated Mar. 9, 2021, with English translation.
(Continued)

*Primary Examiner* — Alexander Krzystan
(74) *Attorney, Agent, or Firm* — Birch, Stewart, Kolasch & Birch, LLP

(57) ABSTRACT

Provided is a box-shaped soundproof structure that is small and light and can sufficiently reduce noise with a natural frequency of a sound source. A box at least a part of which is opened; and a sound reduction structure including a resonator disposed in the box are included, and a sound generated from a sound source disposed in contact with an outer surface of a wall of the box or in the box and emitted from an open surface of the box to the outside is reduced by the sound reduction structure.

16 Claims, 26 Drawing Sheets

(51) Int. Cl.
*G10K 11/172* (2006.01)
*B60K 6/22* (2007.10)
(52) U.S. Cl.
CPC ............ *B60K 6/22* (2013.01); *B60Y 2200/91* (2013.01); *B60Y 2200/92* (2013.01)
(58) Field of Classification Search
USPC ................. 381/71.4, 71.14, 86; 181/202
See application file for complete search history.

(56) References Cited

U.S. PATENT DOCUMENTS

| | | | |
|---|---|---|---|
| 2002/0153181 A1 | 10/2002 | Nakamura | |
| 2006/0131104 A1 | 6/2006 | Yamaguchi et al. | |
| 2006/0231329 A1* | 10/2006 | Borja | F02C 7/045 181/250 |
| 2008/0053749 A1* | 3/2008 | Utsunomiya | G03B 21/16 181/284 |
| 2009/0007876 A1* | 1/2009 | Arruda | F02M 35/10255 123/184.52 |
| 2009/0205901 A1 | 8/2009 | Tanase et al. | |
| 2012/0024623 A1* | 2/2012 | Tange | F02M 35/1266 181/224 |
| 2014/0166394 A1* | 6/2014 | Winkel | F01N 1/02 181/228 |
| 2016/0059797 A1* | 3/2016 | Fushiki | B60R 13/0815 296/39.3 |
| 2017/0066391 A1 | 3/2017 | Yanazawa et al. | |
| 2018/0051462 A1 | 2/2018 | Hakuta et al. | |
| 2018/0122352 A1 | 5/2018 | Hakuta et al. | |
| 2019/0017232 A1* | 1/2019 | Zhao | B62D 25/082 |
| 2022/0153069 A1* | 5/2022 | Heo | B60C 5/002 |

FOREIGN PATENT DOCUMENTS

| | | |
|---|---|---|
| CN | 10638243 A | 2/2017 |
| EP | 2093754 A2 | 8/2009 |
| JP | 60-248437 A | 12/1985 |
| JP | 8-241084 A | 9/1996 |
| JP | 9-213541 A | 8/1997 |
| JP | 2001-233244 A | 8/2001 |
| JP | 2004-264372 A | 9/2004 |
| JP | 2007-163685 A | 6/2007 |
| JP | 2009226101 A | 10/2009 |
| JP | 201052632 A | 3/2010 |
| JP | 2011-59208 A | 3/2011 |
| JP | 2011-118338 A | 6/2011 |
| JP | 2014-164237 A | 9/2014 |
| JP | WO2016/208580 A1 | 12/2016 |
| JP | 2017-55537 A | 3/2017 |
| TW | M531989 U | 11/2016 |
| WO | WO 2018/208580 A1 | 12/2016 |
| WO | WO 2017/033798 A1 | 3/2017 |

OTHER PUBLICATIONS

International Preliminary Report on Patentability (PCT/IPEA/409) dated Dec. 5, 2019 for Application No. PCT/JP2018/037935, along with an English translation.
International Search Report (PCT/ISR/210) dated Dec. 25, 2018 for Application No. PCT/JP2018/037935, along with an English translation.
Extended European Search Report, dated Nov. 6, 2020, for corresponding European Application No. 18866496.5.
Japanese Office Action, dated Jun. 1, 2021, for corresponding Japanese Application No. 2019-548236, with an English translation.
Komada, "Vibration Noise Phenomenon of Hybrid Vehicles and its Reduction Technology," Journal of the Japan Society of Mechanical Engineers. vol. 110, No. 1064, https://doi.org/10.1299/jsmemag.110.1064_545, Jul. 2007, p. 545.
English Machine Transaiion of WO 2016/208580-A1, dated Dec. 29, 2016.
English Machine Translation of JP 2004-264372-A, dated Sep. 24, 2004.
English Machine Translation of JP 2010-52632-A, dated Mar. 11, 2010.
English Machine Translation of JP 2011-59208-A, dated Mar. 24, 2011.
English Machine Translation of JP 8-241084-A, dated Sep. 17, 1996.
European Communication pursuant to Article 94(3) EPC for corresponding European Application No. 18866496.5, dated Sep. 8, 2022.
Chinese Office Action and Search Report for corresponding Chinese Application No. 201880065911.9, dated Feb. 20, 2023, with partial English translation.

* cited by examiner

BOX-SHAPED SOUNDPROOF STRUCTURE AND TRANSPORTATION APPARATUS

CROSS-REFERENCE TO RELATED APPLICATIONS

This application is a Continuation of PCT International Application No. PCT/JP2018/037935 filed on Oct. 11, 2018, which claims priority under 35 U.S.C. § 119(a) to Japanese Patent Application No. 2017-197362, filed on Oct. 11, 2017 and Japanese Patent Application No. 2018-079679, filed on Apr. 18, 2018. Each of the above applications is hereby expressly incorporated by reference, in its entirety, into the present application.

BACKGROUND OF THE INVENTION

1. Field of the Invention

The present invention relates to a box-shaped soundproof structure and a transportation apparatus.

2. Description of the Related Art

Along with multifunctionality and high performance, it is necessary that various electronic apparatuses such as a copier, electronic devices mounted on vehicles, and an electronic apparatus of home appliances are driven at a high voltage and current, and electric output has increased. In addition, with an increase in output and reduction in size, the necessity of controlling heat or air for cooling has increased, and fans and the like have become important.

The electronic apparatus or the like includes an electronic circuit and an electric motor that are noise sources, and each of the electronic circuit and the electric motor (hereinafter, also referred to as a sound source) generates a sound with a great sound volume with a natural frequency. In a case where the output of the electric system increases, a sound volume with this frequency further increases which causes a problem as noise.

For example, in a case of an electric motor, noise (electromagnetic noise) with a frequency corresponding to a rotation speed is generated. In a case of an inverter, noise (switching noise) is generated according to a carrier frequency. In a case of a fan, noise with a frequency corresponding to a rotation speed is generated. The volume of these noises is greater than that of a sound with a similar frequency.

In order to prevent the noise generated from a sound source such as the electric motor from being radiated to the outside of a housing accommodating the sound source such as the electric motor, a sound reduction structure such as a porous sound absorbing body is disposed in the housing.

For example, JP2009-226101A discloses sound reduction means including a tray-shaped container, a gas adsorbent accommodated in the container, a support having air permeability and covering the gas adsorbent, and a sound absorbing material provided on the support, in which the sound reduction means are disposed in an air blowing chamber in which an electric blower (sound source) is disposed, thereby reducing operating noise (see FIG. 3 of JP2009-226101A).

SUMMARY OF THE INVENTION

In a case where a porous sound absorbing body is used as sound reduction means, a sound reduction effect is obtained in a wide frequency range. Therefore, in a case of the noise having no frequency dependency such as white noise, a suitable sound reduction effect is obtained.

However, sound sources such as electric motors generate loud sounds at their own frequencies. Increasing the output of the electric system further increases the sound volume with this frequency. An ordinary porous sound absorbing body such as urethane foam or felt reduces the sound with a wide frequency range, and accordingly, noise with a natural frequency of the sound source may not be sufficiently reduced, and not only the noise with the natural frequency, but also sounds at other frequencies are reduced. Accordingly, the situation where the sound with the natural frequency is more audible prominently than the sounds at other frequencies does not change. Compared to noise at broad frequencies such as white noise and pink noise, noise with a specific frequency which is a single frequency can be easily sensed by human, and the sound volume may be an evaluation value or more of the noise volume of A-weighting or the like which is a problem. Therefore, there has been a problem that even after the countermeasure is taken with the porous sound absorbing body, the sound becomes relatively more audible than sounds at other frequencies.

In a case where a large amount of porous sound absorbing body is used, it is possible to sufficiently reduce noise with the natural frequency of the sound source. However, an electronic apparatus and the like are often required to be reduced in size and weight, and it is difficult to ensure a space for disposing a large amount of porous sound absorbing body in the vicinity of an electronic circuit, an electric motor, and the like of the electronic apparatus. In addition, by disposing a large amount of porous sound absorbing body, the heat insulating effect is generally increased, and accordingly, heat is easily stored in an electronic apparatus or a housing.

An object of the invention to solve the problems of the technologies of the related art to provide a box-shaped soundproof structure and a transportation apparatus that are small and light, and can sufficiently reduce noise with a natural frequency of a sound source.

The inventors have conducted intensive studies to solve the above problems, and as a result, the inventors have found that the above problems can solved by including a sound reduction structure that includes a box at least a part of which is opened, and a resonator disposed in the box, and reducing a sound generated from a sound source disposed in contact with an outer surface of a wall of the box or in the box and emitted from an open surface of the box to the outside by the sound reduction structure, and completed the invention.

That is, the inventors have found that the above problem can be solved by the following configurations.

[1] A box-shaped soundproof structure including:

a box at least a part of which is opened; and a sound reduction structure including a resonator disposed in the box, in which a sound generated from a sound source disposed in contact with an outer surface of a wall of the box or in the box and emitted from an open surface of the box to the outside is reduced by the sound reduction structure.

[2] The box-shaped soundproof structure according to [1], in which the resonator includes a frame at least one surface of which is opened, and a membrane-like member disposed on an open surface of the frame, and the membrane-like member is a resonator that performs membrane vibration.

[3] The box-shaped soundproof structure according to [2], in which a normal incidence sound absorption coefficient in a high-order vibration mode is greater than a normal incidence sound absorption coefficient in a fundamental vibration mode of the membrane vibration of the resonator that performs the membrane vibration.

[4] The box-shaped soundproof structure according to [2] or [3], in which the membrane-like member is formed of metal.

[5] The box-shaped soundproof structure according to any one of [2] to [4] in which the frame has one surface as an open surface and the membrane-like member is disposed on the open surface to form a closed space surrounded by the frame and the membrane-like member.

[6] The box-shaped soundproof structure according to [1], in which the resonator is at least one of a Helmholtz resonator or an air column resonator.

[7] The box-shaped soundproof structure according to any one of [1] to [6], in which the resonator is formed by laminating two or more layers in total of at least one or more of the membrane-like member or a plate-shaped member having through holes, with the frame interposed therebetween.

[8] The box-shaped soundproof structure according to any one of [1] to [7], in which a thickness of the resonator is 20 mm or less.

[9] The box-shaped soundproof structure according to any one of [1] to [8], in which the sound source has at least one natural frequency of the sound source at which a sound volume is at a peak.

[10] The box-shaped soundproof structure according to [9], in which a resonance frequency of the resonator is within a range of ±20% of the natural frequency of the sound source.

[11] The box-shaped soundproof structure according to [9] or [10], in which the resonator is disposed on an extension of a direction of a maximum sound volume in a sound source radiation distribution in a natural frequency of the sound source.

[12] The box-shaped soundproof structure according to any one of [1] to [11], in which the resonance frequency of a resonator is within a range of +20% of a resonance frequency of resonance occurring in the box.

[13] The box-shaped soundproof structure according to any one of [1] to [12], in which at least a part of the resonator is attached to an inner wall surface of the box.

[14] The box-shaped soundproof structure according to any one of [1] to [13], in which a part of the wall of the box is used as a part of the resonator.

[15] The box-shaped soundproof structure according to any one of [1] to [14], in which the resonator is formed as a separate body from the box, and is attachable and detachable.

[16] The box-shaped soundproof structure according to any one of [1] to [15], in which the sound reduction structure has a plurality of types of resonators that resonate at frequencies different from each other.

[17] The box-shaped soundproof structure according to [16], in which the plurality of types of resonators are disposed on the same plane.

[18] The box-shaped soundproof structure according to [16] or [17], in which the plurality of types of resonators have the same thickness.

[19] The box-shaped soundproof structure according to any one of [16] to [18], in which the plurality of types of resonators have the same size.

[20] The box-shaped soundproof structure according to any one of [1] to [19], in which the resonator is disposed at a corner of the box.

[21] The box-shaped soundproof structure according to any one of [1] to [20], in which the sound reduction structure has a porous sound absorbing body.

[22] The box-shaped soundproof structure according to [21], in which the porous sound absorbing body is in contact with at least a part of an upper surface of the resonator.

[23] The box-shaped soundproof structure according to any one of [1] to [22], in which an air-permeable member is attached to a part or all of the open surface of the box.

[24] The box-shaped soundproof structure according to [23], in which the air-permeable member is a sound absorbing member.

[25] The box-shaped soundproof structure according to any one of [1] to [24], in which, in a case where a distance from any one open portion of the box to a farthest position in the box in a direction perpendicular to the open portion is defined as a box depth,
at least a part of the resonator is disposed at a position farther than a half the box depth from the open portion.

[26] The box-shaped soundproof structure according to any one of [1] to [25], in which a longest length of the inside of the box is longer than a half of a wavelength of a natural frequency of the sound source.

[27] The box-shaped soundproof structure according to any one of [1] to [26], in which the box has a rectangular parallelepiped shape.

[28] The box-shaped soundproof structure according to any one of [1] to [27], in which the box-shaped soundproof structure is attachable to and detachable from the sound source, and is disposed to cover the sound source.

[29] The box-shaped soundproof structure according to any one of [1] to [28], in which the sound source is at least one of an electric motor or an inverter.

[30] A transportation apparatus including: at least one of an electric motor or an inverter as a sound source; and the box-shaped soundproof structure according to any one of [1] to [29],
in which at least one of the electric motor or the inverter is set as a sound reduction target, and the sound source as the sound reduction target is installed to be disposed in contact with the box or in the box.

[31] The transportation apparatus according to [30], in which the transportation apparatus is a vehicle.

[32] The transportation apparatus according to [30] or [31], in which the sound reduction structure of the box-shaped soundproof structure is disposed at a position intercepting a straight line connecting a position of the sound source and a position of a seat in the transportation apparatus.

According to the invention, it is possible to provide a box-shaped soundproof structure and a transportation apparatus that are small and light and can sufficiently reduce noise with a natural frequency of a sound source.

DESCRIPTION OF THE PREFERRED EMBODIMENTS

Hereinafter, the invention will be described in detail.

The description of the constituent elements described below may be made based on typical embodiments of the invention, but the invention is not limited to such embodiments.

In this specification, a numerical range expressed using "to" means a range including numerical values described before and after "to" as a lower limit value and an upper limit value.

Further, in this specification, for example, angles such as "45°", "parallel", "vertical", and "perpendicular" mean that a difference from an exact angle is within a range of less than 5 degrees, unless otherwise specified. The difference from the exact angle is preferably less than 4 degrees and more preferably less than 3 degrees.

In this specification, "the same" include an error range generally accepted in the technical field. In this specification, "entire part", "all", and "entire surface" may be 100%, and may include an error range generally accepted in the technical field, for example, 99% or more, 95% or more, or 90% or more.

[Box-Shaped Soundproof Structure]

There is provided a box-shaped soundproof structure of the invention, including a box at least a part of which is opened, and a sound reduction structure including a resonator disposed in the box, in which a sound generated from a sound source disposed in contact with an outer surface of a wall of the box or in the box and emitted from an open surface of the box to the outside is reduced by the sound reduction structure.

An example of the box-shaped soundproof structure of the invention will be described with reference to FIG. 1.

Figure 1:
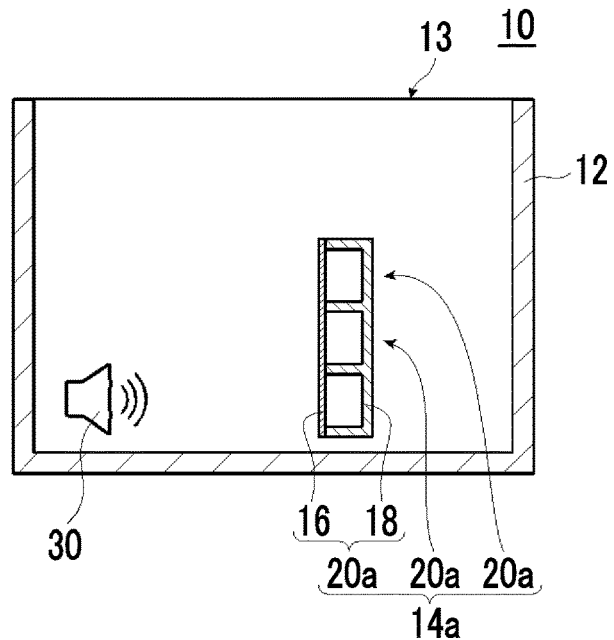
FIG. 1 is a cross-sectional view schematically showing one example of a box-shaped soundproof structure of the invention.

FIG. 1 is a schematic cross-sectional view showing an example of the box-shaped soundproof structure of the invention.

As shown in FIG. 1, a box-shaped soundproof structure 10 includes a box 12 and a sound reduction structure 14, and a sound source 30 is disposed in the box 12.

The box-shaped soundproof structure 10 of the invention is suitably applied to various electronic apparatuses, a transportation apparatus, moving objects, and the like.

The electronic apparatus includes household appliance such as an air conditioner, an air conditioner outdoor unit, a water heater, a ventilation fan, a refrigerator, a vacuum cleaner, an air purifier, an electric fan, a dishwasher, a microwave oven, a washing machine, a television, a mobile phone, a smartphone, and a printer; office equipment such as a copier, a projector, a desktop PC (personal computer), a notebook PC, a monitor, and a shredder; computer apparatuses that uses high power such as a server and a supercomputer; scientific laboratory equipment such as a constant-temperature tank, an environmental tester, a dryer, an ultrasonic cleaner, a centrifugal separator, a cleaner, a spin coater, a bar coater, and a transporter.

The transportation apparatus includes a vehicle (including a bus, a taxi, and the like), a motorcycle, a train, an aviation instrument (an airplane, a fighter, a helicopter, and the like), a ship, a bicycle (particularly an electric bicycle), an aerospace instrument (a rocket and the like), and a personal mobility. Particularly in a hybrid vehicle or an electric vehicle, there is a problem that a specific sound caused by a motor and a power control unit (PCU: including an inverter, a battery voltage boosting unit and the like) mounted inside the vehicle can be heard even in the vehicle interior.

Journal of the Japan Society of Mechanical Engineers 2007. 7 Vol. 110 No. 1064, "Vibration noise phenomena of hybrid vehicles and reduction technology thereof" discloses motor electromagnetic noise and switching noise, a reason thereof and typical noise frequencies. According to a comparison table disclosed in Table 1, it is disclosed that the motor electromagnetic noise at several hundred Hz to several kHz and the switching noise at several kHz to several tens kHz are noise on a higher frequency side than other noise frequencies.

In addition, for example, on p. 30 of the Toyota Motor Corporation PRIUS Manual (2015) discloses "operating noise of an electric motor from an engine room ("sound" at the time of accelerating, and "sound" at the time of decelerating)" as "specific sound and vibration of the hybrid vehicles".

In addition, EV-9 of the manual (2011) of Nissan Motor LEAF, which is an electric vehicle, discloses "sound of a motor generated from a motor room" as "sound and vibration".

As described above, as vehicles become hybrid and electric vehicles, noise on a high frequency side, which has not generated in the past, is generated with a magnitude that can be heard in a vehicle interior.

Examples of a moving object include a consumer robot (a cleaning use, a communication use such as a pet use and a guidance use, and a movement assisting use such as a wheelchair) and an industrial robot.

The entire apparatus can be considered as one box-shaped structure or a part of the structure in the device may be considered as a box-shaped structure. For example, fans of various electronic apparatus serve as sound sources, and the device including a portion connecting to the outside can be considered as a box-shaped structure.

In addition, in a transportation apparatus, an engine room or a motor room of a vehicle can be considered as a box-shaped structure having a space, and an engine, an electric motor, an inverter, and the like therein can be considered as noise sources. Regarding this space, an open portion or a radiator portion on a lower portion of an engine room or a motor room, or a duct portion connecting to the inside of the vehicle interior can be considered as the space.

In addition, the box-shaped structure can also be used for an apparatus set to emit at least one or more specific single frequency sounds or a combination thereof as a notification sound, a warning sound, or a signature sound, in order to send notification or warning to a user.

Further, the box-shaped soundproof structure of the invention can also be applied to a room, a factory, a garage, and the like in which the above-described apparatuses are housed.

The sound source 30 is an electronic part including an electric control device such as an inverter, a power supply, a booster, a large-capacity condenser, a ceramic condenser, an inductor, a coil, a switching power supply, and a transformer; a rotary part such as an electric motor or a fan; and a mechanical part such as a moving mechanism using a gear and an actuator, which are included in the various apparatuses described above.

In a case where the sound source 30 is an electronic part such as an inverter, the sound source generates a sound (switching noise) according to a carrier frequency.

In a case where the sound source 30 is an electric motor, the sound source generates a sound (electromagnetic noise)

with a frequency corresponding to a rotation speed. At this time, the frequency of the generated sound is not necessarily limited by the rotation speed or a multiple thereof, but there is a strong relationship that the sound increases as the rotation speed increases.

That is, each of the sound sources 30 generates a sound with a natural frequency of the sound source 30.

The sound source 30 with a natural frequency often has a physical or electrical mechanism that performs oscillation at a specific frequency. For example, in a rotating system (such as a fan), a frequency determined by the number of blades and the rotation speed, and a multiple thereof are directly emitted as a sound. In addition, a portion receiving an AC electric signal of an inverter often emits a sound corresponding to the AC frequency. Therefore, the rotating system or an AC circuit system is a sound source with a natural frequency of the sound source.

More generally, the following experiment can be performed to determine whether a sound source has a natural frequency.

The sound source 30 is placed in an anechoic room or a semi-anechoic room, or in a situation surrounded by a sound absorbing body such as urethane. By setting a sound absorbing body in the periphery, the influence of reflection interference of a room or a measurement system is eliminated. Then, the sound source 30 is allowed to generate a sound and measurement is performed with a microphone from a separated position to obtain frequency information. A distance between the sound source and the microphone can be appropriately selected depending on the size of the measurement system, and it is desirable to perform the measurement at a distance of appropriately 30 cm or more.

In the frequency information of the sound source 30, a maximum value is referred to as a peak, and a frequency thereof is referred to as a peak frequency. In a case where the maximum value is higher than that of a sound with a peripheral frequency by 3 dB or higher, the sound with the peak frequency can be sufficiently recognized by human beings, and accordingly, it can be referred to as a sound source with a natural frequency. In a case where the maximum value is higher by 5 dB or more, it can be more recognized, and in a case where the maximum value is higher by 10 dB or more, it can be even more recognized. The comparison with the peripheral frequencies is made by evaluating a difference between a minimum value of the nearest frequency at which the frequency is minimum excluding signal noise and fluctuation, and the maximum value.

In addition, in a case where the sound emitted from the sound source 30 resonates in a housing (the box 12), a volume of a sound with the resonance frequency or the frequency of the overtone may increase.

In addition, the sound emitted from the sound source 30 is emitted with a resonance frequency of a mechanical structure of the entire box-shaped soundproof structure 10, the box 12, or a member disposed in the box 12, and a volume of a sound with the resonance frequency or a frequency of the overtone thereof may increase. For example, even in a case where the sound source 30 is a fan, a resonance sound may be generated at a rotation speed much higher than the rotation speed of the fan due to the resonance of the mechanical structure.

As the box 12, the housings of the above-described various devices can be regarded as the box 12. Alternatively, a part of a housing that accommodates a part serving as the sound source 30 included in the various apparatuses described above can be regarded as the box 12. Alternatively, a room, a factory, a garage, and the like in which the above-described various devices are placed can be regarded as the box 12. These boxes 12 are at least partially open.

A size of the open portion 13 of the box 12 is not particularly limited as long as it is open, but the invention can be suitably applied, in a case where a sound as a sound reduction target is an airborne sound having a main transmission path passing through the open portion among the transmission paths to the outside.

For example, in a box in which a small hole is formed with respect to a surface area of the box 12, a main external radiated sound may not be the airborne sound from the hole but the vibration of the box itself. However, the invention is more desirably applied to a box in which a main component of the external radiated sound is the airborne sound, than in the above case.

The measurement regarding the airborne sound can be performed with a microphone, and the measurement of a solid-vibration sound can be performed with a vibration measuring instrument, and accordingly, the transmission path can be determined by the measurement.

In an example shown in FIG. 1, the box 12 has a rectangular parallelepiped shape with a hollow inner portion, and includes an open portion 13 opened to one surface, and the sound source 30 and a sound reduction structure 14a disposed therein.

The sound reduction structure 14a includes a plurality of resonators 20a and is arranged in the box 12.

Figure 2:
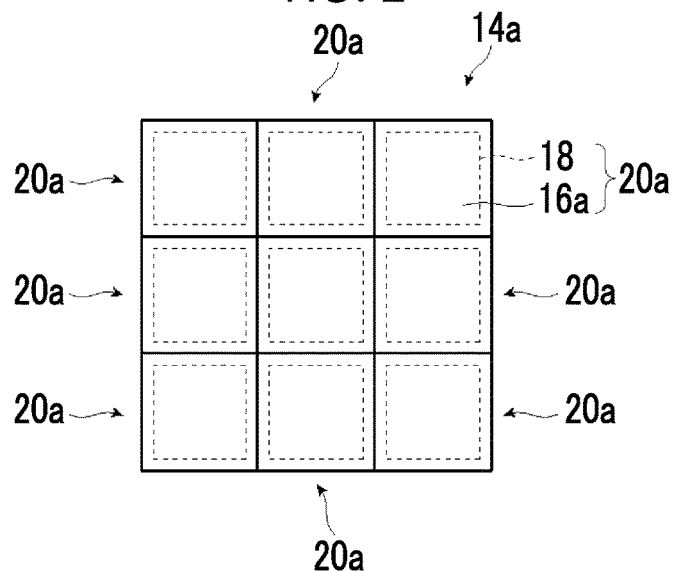
FIG. 2 is a front view schematically showing a sound reduction structure.

FIG. 2 shows a front view of the sound reduction structure 14a.

In the example shown in FIG. 2, the sound reduction structure 14a includes nine resonators 20a and is arranged in 3×3.

The resonator 20a exhibits at least one of sound absorption or reflection by using a resonance phenomenon and selectively reduces a sound with a specific frequency (frequency band).

Figure 3:
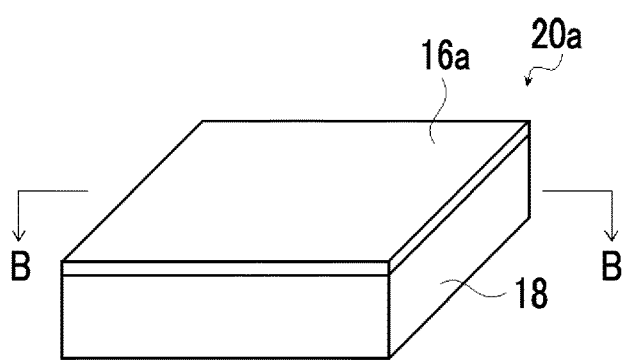
FIG. 3 is a perspective view schematically showing a resonator.
Figure 4:
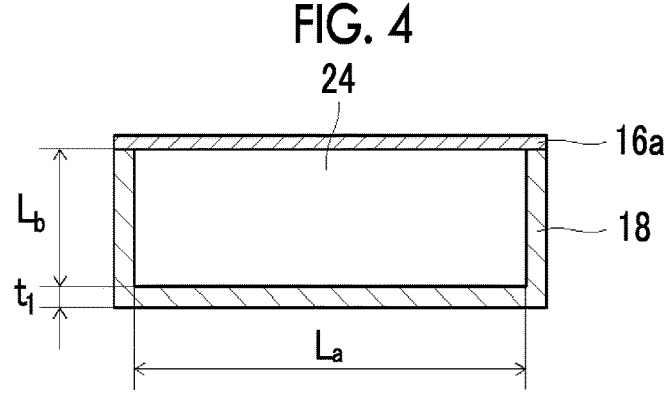
FIG. 4 is a cross-sectional view taken along line B-B of FIG. 3.

FIG. 3 is a perspective view showing one of the resonator 20a of the sound reduction structure, and FIG. 4 is a cross-sectional view taken along line B-B of FIG. 3.

The resonator 20a shown in FIGS. 3 and 4 includes a frame 18 having one surface opened, and a membrane-like member 16 disposed on the open surface of the frame 18. The membrane-like member 16 covers the open surface of the frame 18, and has a peripheral portion fixed to and supported by the frame 18 to be able to vibrate, thereby being a resonator using membrane vibration.

As is well known, the sound reduction by resonance is to selectively reduce a sound with a specific frequency (frequency band) using a resonance phenomenon.

In particular, the resonance phenomenon of the resonator according to the invention is mainly for airborne sound, and is the absorbing and/or the insulating of the sound. In addition, there is a phenomenon of damping and/or vibration prevention for preventing solid-state vibration, but the invention is suitable for preventing the airborne sound. Although the invention can be used in a system in which both the solid-state vibration and the airborne sound are transmitted to the same device, the invention is suitable to be applied to a system in which airborne sound is mainly transmitted.

In the following description, a resonator that uses membrane vibration is also referred to as a membrane type resonator.

In the resonator 20a using the membrane vibration, a resonance frequency of the membrane vibration of the resonator 20a may be appropriately set so as to reduce the sound with a natural frequency of the sound source 30.

The resonance frequency of the membrane vibration is determined according to a size, a thickness, a hardness and the like of the membrane-like member 16a. Therefore, by adjusting the size, the thickness, the hardness, and the like of the membrane-like member 16a, the frequency of the resonating sound can be appropriately set.

In addition, a through hole or a cut may be provided in the vibrating membrane-like member 16a. In this case, the resonance frequency of the membrane vibration changes due to the influence of the penetrating portion, but the sound absorption characteristics can be designed including this influence. For example, in a case where a penetrating portion is in the vicinity of the center of the membrane-like member 16a, it is possible to design that the resonance is shifted to a high frequency side due to the effect of reducing a weight of the membrane. Further, by making a cut in the vicinity of the fixed portion of the membrane, a surrounding constraint condition changes, and a frequency width of resonance can be widened.

In addition, by providing the penetrating portion in the membrane-like member, air can flow in and out of the resonator 20a. Accordingly, for example, in a case of being used in a system with a significant temperature or humidity change or pressure change, differences in temperature, humidity, and pressure between the inside and the outside hardly occurs. Therefore, a change in tension applied to the membrane-like member can be prevented. In addition, there is an advantage that dew condensation and the like hardly occur.

In addition, a member having air permeability (air-permeable member) can be disposed on a front surface or a rear surface to come into contact with the vibrating membrane-like member 16a to improve hardness (durability) of the membrane-like member 16a. As the air-permeable member, a member such as a yarn (spun yarn), a nonwoven fabric, a woven fabric, a frame, or an air-permeable membrane, through which a sound is transmitted, can be used.

As the nonwoven fabric, a cloth material such as a glass cloth is particularly preferable. In addition, a paper material or the like which can be air-permeated can be used.

As the woven fabric, a mesh member, particularly a mesh member formed of a highly durable material such as a metal mesh and a glass fiber mesh is preferable. In addition, a woven fabric or the like made of carbon, metal, glass, or the like can also be used.

For the frame, a structure formed of plastic or metal in a lattice shape where an opening is formed, or mainly paper, metal, or plastic in which a plurality of circular through holes are formed by punching or laser can be used.

In addition, a porous sound absorbing body can be disposed inside, on a side surface or a front surface of the membrane type resonator. This makes it possible to achieve both wide-band sound absorbing properties of the porous sound absorbing body and great sound reduction properties of the resonator at a specific frequency. In particular, by disposing the porous sound absorbing body on the surface portion, for example, on the membrane-like member, both properties can be satisfied without changing a ground contact area. In the membrane type resonator, the upper portion of the membrane-like member corresponds to an upper surface of the resonator.

As described above, various electronic devices such as copiers include sound sources such as electronic circuits and electric motors, which generate noise, and these sound sources generate loud sounds with specific frequencies. In order to prevent the noise generated from such a sound source from being emitted to the outside of the box accommodating the sound source, the porous sound absorbing body is disposed as sound reduction means in the box.

However, since the porous sound absorbing body reduces sounds with wide frequencies, the noise with the natural frequency of the sound source may not be sufficiently reduced, and the noise may be relatively more audible than other frequencies as a tone sound (sound having a maximum sound pressure with a specific frequency), because the noise with a natural frequency is still higher than the peripheral frequency. In addition, in a case where a large amount of porous sound absorbing body is used, it is possible to reduce the noise with a natural frequency of the sound source with the porous sound absorbing body, but there is a problem that it is difficult to reduce the size and weight.

In contrast, in the box-shaped soundproof structure 10 of the invention, the sound reduction structure 14 including the resonator 20 is disposed in the box 12 accommodating the sound source 30. In the sound reduction performed by the resonator 20, a sound with a specific frequency (frequency band) can be selectively reduced by using the resonance phenomenon. Accordingly, by setting a resonance frequency of the resonator 20 to reduce the sound with a natural frequency of the sound source 30, it is possible to reduce a sound with a natural frequency of the sound source 30 that is generated from the sound source 30 to be emitted outside from the open portion 13 of the box 12. Since the sound with a natural frequency of the sound source 30 can be selectively reduced, a relative volume difference from other frequencies can be reduced, thereby preventing a sound with a specific frequency from being noticeable.

In addition, since the resonator can selectively reduce the sound with a natural frequency of the sound source 30 by resonance, it is not necessary to make the volume large as in a case of the porous sound absorbing body, and it is possible to exhibit a high sound reduction effect with a small size and a lightweight.

Here, in the example shown in FIG. 2, the sound reduction structure 14a is configured to have the same type of nine resonators 20a that resonate at the same frequency. However, the configuration is not limited to this, and the configuration of including a plurality of types of resonators that resonate at different frequencies may be used.

Figure 5:
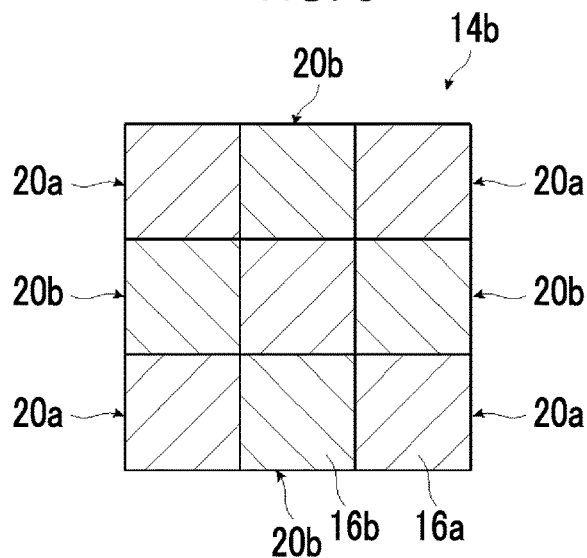
FIG. 5 is a front view schematically showing another example of the sound reduction structure.

For example, a sound reduction structure 14b shown in FIG. 5 includes two types of resonators 20a and 20b that resonate at different frequencies. In FIG. 5, the resonators 20a and the resonators 20b are arranged alternately.

In FIG. 5, the resonator 20a and the resonator 20b have different types of membrane-like member. That is, the membrane-like member 16a of the resonator 20a and a membrane-like member 16b of the resonator 20b are different in terms of a size, a thickness, a hardness, and the like, thereby resonating at different frequencies.

The sound reduction structure 14b shown in FIG. 5 has a configuration having two types of resonators, but the invention is not limited to this, and the sound reduction structure may have three or more types of resonators.

In the present specification, different reference numerals are used for the sound reduction structures having different configurations, such as 14a, 14b, . . . , but in a case where it is not necessary to distinguish these sound reduction structures, the reference numeral 14 is used. In the same manner, different reference numerals are used for the resonators having different configurations, such as 20a, 20b, . . . , but in a case where it is not necessary to distinguish these resonators, the reference numeral 20 is used. In the same manner, different reference numerals are used for the membrane-like members having different configurations, such as 16a, 16b, . . . , but in a case where it is not necessary to distinguish these membrane-like members, the reference numeral 16 is used.

Further, in the example shown in FIG. 5, the sound reduction structure is configured to include a plurality of types of resonators having different resonance frequencies due to different types of the membrane-like members. However, the configuration is not limited thereto, and, as shown in FIG. 6, a configuration of including a plurality of resonators having different resonance frequencies may be provided due to different sizes of the membrane-like members, that is, different sizes of the open surface of the frame 18.

Figure 6:
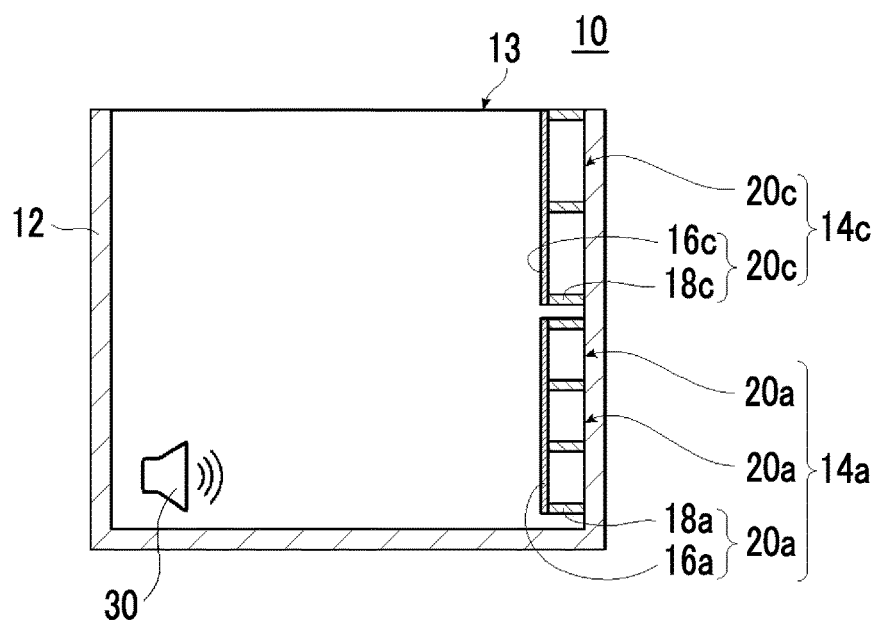
FIG. 6 is a cross-sectional view schematically showing another example of the box-shaped soundproof structure.

The box-shaped soundproof structure 10 shown in FIG. 6 includes two sound reduction structures 14a and 14c. The sound reduction structure 14a includes the resonator 20a, and the sound reduction structure 14c includes a resonator 20c. The resonator 20a and the resonator 20c are different from each other in terms of a size of open surface of the frame 18. Therefore, the resonator 20a and the resonator 20c resonate at different frequencies.

In the example shown in FIG. 4, the frame 18 has a shape opened to one surface, the membrane-like member 16 is disposed to cover the open surface so that the resonator 20 forms a closed space surrounded by the frame 18 and the membrane-like member 16, but the configuration is not limited to this. A surface of the frame 18 opposite to the surface on which the membrane-like member 16 is disposed may be an open surface. That is, the resonator 20 may be configured not to form a closed space.

Further, even in a case where there is a through hole on the rear surface side of the frame 18 or the resonator 20, the resonance frequency can be designed in accordance with this configuration. In particular, in a case where a size of the through hole is as small as several mm or less, air permeability to the outside can be obtained while having a similar effect of the closed space with respect to the sound. Accordingly, in a system with a significant temperature or humidity change or pressure change, it is possible to prevent expansion of each portion (particularly, the membrane-like member) and dew condensation, and this is a desirable behavior in that durability against the environment is improved.

In addition, in the example shown in FIG. 3, the resonator has a resonance structure that generates membrane vibration, but the configuration is not limited thereto, and a resonance structure that generates an air column resonance or a Helmholtz resonance may be used.

Figure 7:
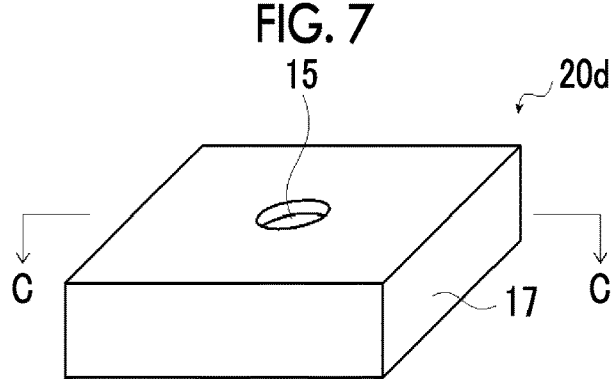
FIG. 7 is a perspective view schematically showing another example of the resonator.
Figure 8:
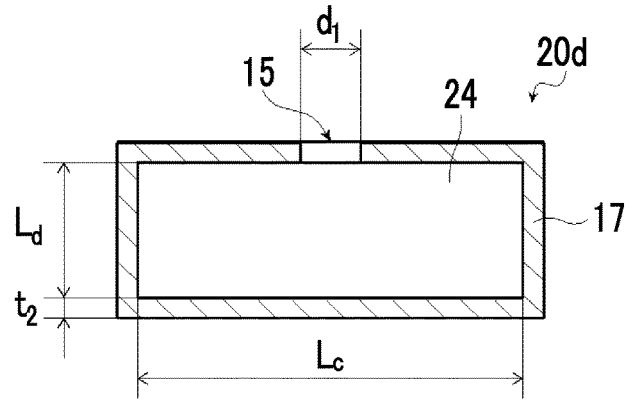
FIG. 8 is a cross-sectional view taken along line C-C of FIG. 7.

FIG. 7 is a schematic perspective view of another example of the resonator. FIG. 8 is a cross-sectional view taken along line C-C of FIG. 7.

A resonator 20d shown in FIGS. 7 and 8 is a rectangular parallelepiped container 17 having a hollow portion 24 therein, and includes an opening 15 for the air flow between the hollow portion 24 and the outside on one surface. The resonator 20d has a resonance structure that allows Helmholtz resonance. The Helmholtz resonance is a phenomenon in which air in the inner portion (hollow portion 24) of the container 17 having the opening 15 serves as a spring and resonates. The resonator 20d has a structure in which the air in the hollow portion 24 serves as a spring using the air in the opening 15 as a mass to perform resonance in a mass-spring system, and the sound is absorbed by thermal viscous friction in the vicinity of the wall of the opening 15. Since a pressure or a local velocity changes outside the opening 15, an effective length of the opening 15 is corrected by opening end correction.

Therefore, in a case where the resonator 20d is used as a resonance structure in which the Helmholtz resonance occurs, a resonance frequency of the Helmholtz resonance may be appropriately set so as to reduce a sound that resonates in a tubular portion. The resonance frequency of the Helmholtz resonance is determined according to an internal volume of the hollow portion 24, an area of an opening 15, and the like. Therefore, by adjusting the internal volume of the hollow portion 24, the area of the opening 15, and the like of the resonator 20d, a frequency of the resonating sound can be appropriately set.

In particular, by setting a circle equivalent diameter of the opening 15 to be larger than a perpendicular length from the opening 15 of the hollow portion 24 to the rear surface, that is, setting the surface opening to be larger than the rear surface distance, a local velocity and a sound field extending to the hollow portion 24 side are strongly affected by the rear surface wall, and accordingly, an opening end correction length increases outside than the opening 15. Therefore, an effect that a result of the opening end correction becomes greater than a theory in the related art is obtained. This lowers the resonance frequency. In this configuration, it is possible to produce a structure in which the resonance occurs on a comparatively low frequency side by a compact resonance structure with a reduced rear surface distance.

Figure 9:
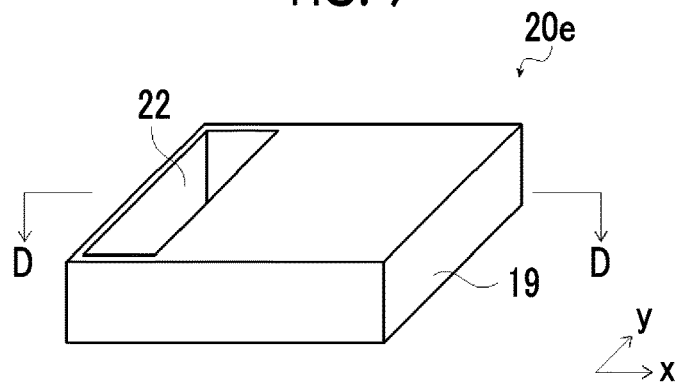
FIG. 9 is a perspective view schematically showing another example of the resonator.
Figure 10:
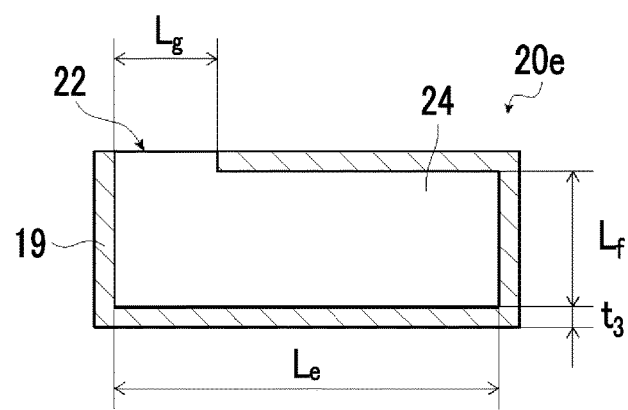
FIG. 10 is a cross-sectional view taken along line D-D of FIG. 9.

FIG. 9 is a schematic perspective view of another example of the resonator. FIG. 10 is a cross-sectional view taken along line D-D of FIG. 9.

A resonator 20e shown in FIGS. 9 and 10 is a rectangular parallelepiped resonance tube 19 having the hollow portion 24 therein, and includes the opening 22 for the air flow between the hollow portion 24 and the outside on one surface. The resonator 20e has a resonance structure that allows air column resonance. Air column resonance occurs in a case where a standing wave is generated in the resonance tube 19 (hollow portion 24) which is a closed tube.

Therefore, in a case where the resonator 20e is used as a resonance structure in which air column resonance occurs, a resonance frequency of air column resonance may be appropriately set so as to reduce a sound that resonates in the resonance tube 19. The resonance frequency of the air column resonance is determined according to a length of the resonance tube 19 (a depth from the opening 22 of the hollow portion 24) and the like. By adjusting the depth of the hollow portion 24, the size of the opening 22, and the like, the frequency of the resonating sound can be suitably set.

The resonator 20 having the opening and the hollow portion 24 has a resonance structure in which the air column resonance occurs, but the resonator may have the resonance structure in which the Helmholtz resonance occurs and this may be determined according to the size and the position of the opening and the size of the hollow portion 24. Accordingly, by suitably adjusting these, it is possible to select any resonance structure of the air column resonance and the Helmholtz resonance.

In a case of air column resonance, in a case where the opening is narrow, the sound wave is reflected by the opening and it is difficult for the sound wave to enter the hollow portion, and accordingly, it is preferable that the opening is wide to some extent. Specifically, in a case where the opening is rectangular, a length of a short side is preferably 1 mm or more, more preferably 3 mm or more, and even more preferably 5 mm or more. In a case where the opening is circular, a diameter is preferably within the above range.

Meanwhile, in a case of Helmholtz resonance, it is necessary to generate thermal viscous friction in the opening, and therefore, it is preferable that the opening is narrow to some extent. Specifically, in a case where the opening is rectangular, a length of a short side is preferably 0.5 mm or more and 20 mm, more preferably 1 mm or more and 15 mm or less, and even more preferably 2 mm or more and 10 mm or less. In a case where the opening is circular, a diameter is preferably within the above range.

In a case where a resonator having these openings is used, there may be a problem that dust accumulates therein. Therefore, by attaching a net, a mesh, a nonwoven fabric, or the like to a surface (opening surface) side having the opening, dust can be prevented from entering.

In addition, the resonance frequency, that is, the resonance band can also be changed by disposing a porous sound absorbing body or an air-permeable membrane or a nonwoven fabric having high air flow resistance on the opening surface or the inner portion. In particular, since a local velocity of a sound increases at the resonance frequency in the vicinity of the opening, the sound absorbing effect can be increased. In a case of a resonator having the opening, the surface on which the opening is formed corresponds to the upper surface of the resonator.

In addition, a porous sound absorbing body can be disposed on the inner portion, the side surface, or the front surface of the resonator having the opening. This makes it possible to achieve both wide-band sound absorbing properties of the porous sound absorbing body and great sound reduction properties of the resonator at a specific frequency. In particular, by disposing the porous sound absorbing body on the surface portion, for example, on the opening surface, both properties can be satisfied without changing a ground contact area.

Here, in a case where the sound reduction structure 14 has a configuration having a plurality of types of resonators 20, a configuration of providing a membrane type resonator and a Helmholtz type resonator may be used. Alternatively, a configuration of providing a membrane type resonator and an air column resonance type resonator may be used. Alternatively, a configuration of providing a Helmholtz type resonator and an air column resonance type resonator may be used. Alternatively, a configuration of providing a membrane type resonator, a Helmholtz type resonator, and an air column resonance type resonator may be used.

At a high frequency, the Helmholtz type resonator and the air column resonance type resonator easily reflect sound waves, so that the sound reduction effect is decreased. On the other hand, the membrane type resonator can obtain a high sound reduction effect regardless of the frequency. Therefore, it is preferable to use a membrane type resonator.

In addition, it is preferable that the membrane type resonator has a configuration in which a normal incidence sound absorption coefficient in a high-order vibration mode of the membrane vibration is greater than a normal incidence sound absorption coefficient in a fundamental vibration mode.

In a membrane type resonator, in addition to the resonance mode based on the fundamental vibration, a sound absorption effect using the resonance mode based on the high-order vibration of the membrane is also exhibited. The high-order vibration mode is more easily exhibited, in a case where the membrane thickness is small. In addition, it was found that, by setting a space on the rear surface side of the membrane-like member (rear surface space) to be small, desirably less than 10 mm, and more desirably 5 mm or less, the resonance sound absorption by high-order vibration tends to be greater than the resonance sound absorption by fundamental vibration. That is, in the membrane type resonator, it is possible to set the normal incidence sound absorption coefficient in the high-order vibration mode to be higher than the normal incidence sound absorption coefficient in the fundamental vibration mode of the membrane vibration. Therefore, for example, in order to absorb a sound on a high frequency side of approximately 3 kHz or higher with a small structure, it is preferable to use a membrane type resonator having a higher normal incidence sound absorption coefficient in the high-order vibration mode than the normal incidence sound absorption coefficient in the fundamental vibration mode of the membrane vibration, by decreasing the membrane thickness and decreasing the thickness of the rear surface space.

As will be described in detail in Examples later, the normal incidence sound absorption coefficient can be evaluated based on JIS A 1405-2.

In addition, the sound reduction structure may have a configuration in which two or more layers in total of at least one or more of the membrane-like member or a plate-shaped member having through holes are laminated with the frame interposed therebetween, that is, two or more resonators are laminated.

Specifically, a two-layer membrane structure including two membranes in each of which a membrane-like member, a frame (air space, rear surface space), a membrane-like member, and a frame (rear surface space) are laminated in this order may be used. Alternatively, a structure in which the membrane structure and the Helmholtz resonance structure are superimposed in which the membrane-like member, a frame (air space, rear surface space), a plate-shaped member having through holes, and a frame (air space) are laminated in this order, may be used.

In the structure in which two or more resonators are laminated, two resonators interact with each other via the air space (rear surface space) between the two layers (membrane-like member or the plate-shaped member having through holes). For example, a structure in which two resonators having a membrane structure are laminated has a plurality of modes such as a mode in which two membrane-like members move in the same direction and a mode in which the membrane-like members move in opposite directions. Accordingly, it is possible to have a plurality of sound absorption peaks and reduce a sound with a plurality of frequencies, compared to a configuration having one membrane-like member. Therefore, this structure can be suitably used in a case where the noise is the sound with a plurality of frequencies.

The through holes formed in the plate-shaped member may be through holes having various shapes of opening surface such as such as circular, polygonal, slit-like, irregular, and donut-ring-like shapes.

Further, as in the example shown in FIG. 6, a configuration in which two or more sound reduction structures 14 are disposed in the box 12 may be used.

At this time, in the example shown in FIG. 6, the two sound reduction structures 14 are configured to include different resonators 20 (the resonator 20a and the resonator 20c), but it is not limited to this, and one sound reduction structure 14 may be configured to include different types of resonators 20.

The two or more sound reduction structures 14 may be collectively regarded as one sound reduction structure.

In a case where a plurality of types of resonators 20 are provided, the resonators are preferably arranged on the same plane.

Specifically, it is preferable that the front surface sides of the resonators 20 are arranged on the same plane.

In a case of the membrane type resonator 20, it is preferable that the membrane-like members 16 of the plurality of resonators 20 are arranged on the same plane as shown in FIGS. 2 and 5.

In a case of the Helmholtz type resonator 20, the surfaces having the openings are preferably arranged on the same plane.

In a case of the air column resonance type resonator 20, the surfaces having the openings are preferably arranged on the same plane.

Since the surfaces of the resonators 20 are arranged on the same plane, there is no level difference on the surface so that the touch is smooth. Since there is no level difference, dust is less likely accommodated on the surface which makes the clean easy. In a case where there is a level difference, a fluid vortex easily occurs, thereby disturbing transmission of wind or heat, but since the surfaces of the resonators 20 are arranged on the same plane, a flow of wind or heat is not disturbed, and these are preferable points.

In a case where a plurality of types of resonators 20 are provided, the resonators preferably have the same thickness and preferably have the same size.

In a case of the membrane type resonator 20, a thickness of the resonator 20 is a thickness in a direction perpendicular to a membrane surface of the membrane-like member 16. In a case of the Helmholtz type and air column resonance type resonators 20, a thickness is in a direction perpendicular to the plane having the opening.

In a case of the membrane type resonator 20, a size of the resonator 20 is a size of the frame 18, and in a case of the Helmholtz type resonator 20, the size thereof is a size of the container 17, and in a case of the air column resonance type resonator 20, the size thereof is a size of the resonance tube 19. In the invention, the same size means a case where the volume error is ±33% or less.

In addition, in a case of the membrane type resonator 20, a thickness of the resonator is preferably 20 mm or less, more preferably 15 mm or less, even more preferably 10 mm or less, and still preferably 5 mm or less, from a viewpoint of size and weight reduction. Further, the lower limit of the thickness is not limited as long as the membrane-like member can be suitably supported, but is preferably 0.1 mm or more, and more preferably 0.5 mm or more.

Here, the resonator 20 having the above-described resonance structure preferably resonates with a sound in the audible range. In the invention, the audible range is from 20 Hz to 20000 Hz. Further, the resonator 20a preferably resonates with a sound of 100 Hz to 16000 Hz which is more audible, more preferably resonates with a sound of 200 Hz to 12000 Hz, even more preferably resonates with a sound of 2000 Hz to 12000 Hz, and particularly preferably resonates with a sound of 3000 Hz to 10000 Hz.

In addition, from a viewpoint of sound reduction a sound with a natural frequency of the sound source 30, a resonance frequency of the resonator 20 is preferably in a range of ±20% of the natural frequency of the sound source 30.

In addition, as described above, the sound emitted from the sound source 30 may resonate in the box 12 to increase a volume of the sound with a specific frequency. Therefore, from a viewpoint of sound reduction of the sound resonating in the box 12, the resonance frequency of the resonator 20 is preferably within a range of ±20% of the resonance frequency of the resonance generated in the box 12.

A position of the sound reduction structure 14 (resonator 20) in the box 12 is not particularly limited, but it is preferable that at least a part of thereof is disposed in contact with an inner wall surface of the box 12. In a case where the inner wall of the box 12 is not a horizontal plane such as having a curvature, an outer shape of the resonator 20 is preferably set to have a curvature according to the inner wall shape. For example, in a case where the box 12 has a circular inner wall portion and the resonator is disposed therein, it is desirable that the outer shape of a rear surface side of the resonator 20 is a circular shape. In this case, the inner wall shape of the resonator 20 may be circular in accordance with the outer shape, or may be configured only with a horizontal plane.

In particular, in a case where the inner wall of the box 12 has a large curvature or has a complicated shape such as a zigzag shape, a portion where cells of the resonator 20 are not connected or cells are separated from each other on the side close to the rear surface is formed, and the resonator can also be disposed for each cell according to the inner wall shape of the box 12.

Figure 11:
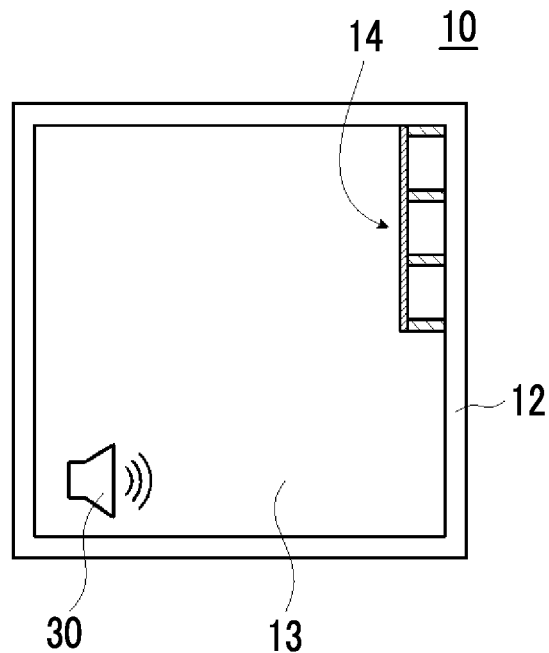
FIG. 11 is a front view for explaining a disposed position of the sound reduction structure.

Moreover, as shown in FIG. 11, it is preferable to dispose the resonator at a corner in the box 12. FIG. 11 is a view of the box-shaped soundproof structure 10 when seen from the open portion 13 of the box 12. The corner is a portion in the vicinity of a side where at least two or more surfaces constituting the box are in contact.

The vicinity of the inner wall surface and the corner of the box 12 are positions where the particle velocity is reduced and the sound pressure is increased due to the presence of the wall surface. Therefore, by disposing the resonator 20 in the vicinity of the inner wall surface and at the corner of the box 12 where the sound pressure increases, it is possible to obtain a higher sound reduction effect.

In addition, it is preferable that at least a part of the resonator 20 is attached to the inner wall surface of the box 12.

Further, it is preferable that the resonator 20 is detachably attached to the inner wall surface of the box 12 as a separate body from the box 12.

Figure 12:
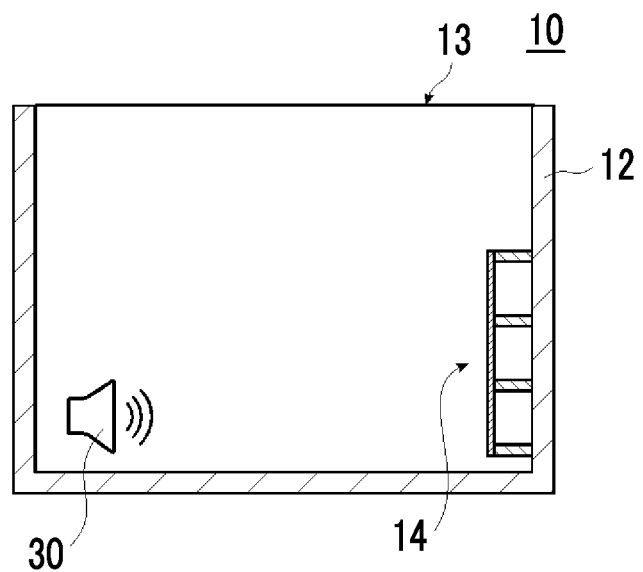
FIG. 12 is a cross-sectional view for explaining a disposed position of the sound reduction structure.

Alternatively, as shown in FIG. 12, it is preferable to use a part of the wall of the box 12 as a part of the resonator 20 (frame, container, or resonance tube).

A method for fixing the resonator 20 (the sound reduction structure 14) to the box 12 is not particularly limited, and fixing using a single-sided tape or a double-sided tape, a method using an adhesive (a type thereof may be an aqueous type, a solvent type, an epoxy type, a silicone type, a hot melt type, an urethane type, and a pressure-sensitive adhesive type, and a curing method may be solvent volatilization, moisture curing, heat curing, curing agent mixing, anaerobic curing, ultraviolet curing, heat melting, pressure sensitive, and re-moistening, and these can be selected according to a material or a disposed position) or a pressure sensitive adhesive, a mechanical fixing method such as a method for fixing by screwing, a method for fitting an inner wall surface having a duckboard shape or unevenness in a manner of shelves, a screwing method using an L-shaped metal or a T-shaped metal, a method for producing a screwing portion on a rear surface end of the resonator 20 in advance and fastening with a screw, a fixing method with an assembly structure or a fitting structure, a fixing method by magnetism using a magnet, or a fixing method by soldering can be suitably used. As a material used for fixing, a material having durability, heat resistance, or the like can be selected.

Figure 13:
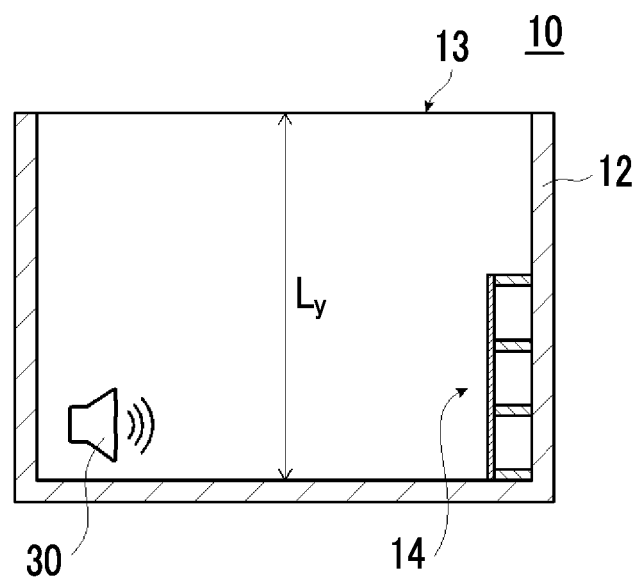
FIG. 13 is a cross-sectional view for explaining a depth of a box.

In a case where a distance from the open portion 13 in the box 12 to a position farthest from the opening in a direction perpendicular to the open portion 13 of the box 12 is defined as a box depth $L_y$ (see FIG. 13), the resonator 20 is preferably disposed at a position far from the open portion 13 by a distance longer than $L_y/2$.

In a case where the resonator is disposed at a position spaced apart from the open portion 13 rather than in the vicinity of the open portion 13, a particle velocity decreases and the sound pressure increases. Accordingly, by disposing the resonator 20 at a position far from the open portion 13 by a distance longer than $L_y/2$, it is possible to obtain a higher sound reduction effect.

In addition, it is preferable that the resonator is disposed on an extension of a direction of a maximum volume in the sound source radiation distribution at a natural frequency of the sound source. Accordingly, a higher sound reduction effect can be obtained.

In a case where the sound source is a speaker, a directivity pattern in the sound source radiation distribution can be determined based on "JIS C 5532: 2014 Loudspeakers For Sound System Equipment".

In addition, in general, it may be difficult to resonate by itself depending on the target sound source. In this case, a maximum direction of the sound source radiation distribution can be obtained by scanning the vicinity of the sound source and recording the sound pressure in a case of the actually sounding is performed, using a measurement microphone or a sound level meter. In addition, in order to obtain a radiation distribution in a case where the resonator is disposed in an actual system, the radiation distribution can be obtained by the same method, also in a case of a sound source that generates a sound itself. It is simple to scan by hand, but a device such as an actuator or an automatic stage may be used.

In addition, a flow of a sound emitted from the sound source can be measured using a multipoint microphone. A radiation position and a direction can be measured using "TETRAPHONE" manufactured by Ono Sokki Co., Ltd., a sound source identification device manufactured by B & K, and the like.

The direction of the loudest sound can be determined by obtaining the radiation distribution of the sound from the sound source by various methods as described above.

In addition, the box-shaped soundproof structure of the invention can be suitably applied in a case where the size of the inner portion of the box 12 is a size so as to resonate at a natural frequency of the sound source 30. Specifically, in a case where the longest length of the inner portion of the box 12 is longer than a half of a wavelength of a natural frequency of the sound source 30, the sound emitted from the sound source 30 resonates in the box 12, a complicated sound field mode that is not a plane wave may be formed inside, and a volume of a sound with a specific frequency may be more increased. On the other hand, the box-shaped soundproof structure of the invention can selectively reduce a sound at a specific frequency, and accordingly, even in such a case, a sound that became loud due to resonance in the box 12 can be suitably reduced.

The longest length of the inner portion of the box 12 is the longest length among the lengths in a direction parallel to any one side of the inner wall of the box 12.

Figure 14:
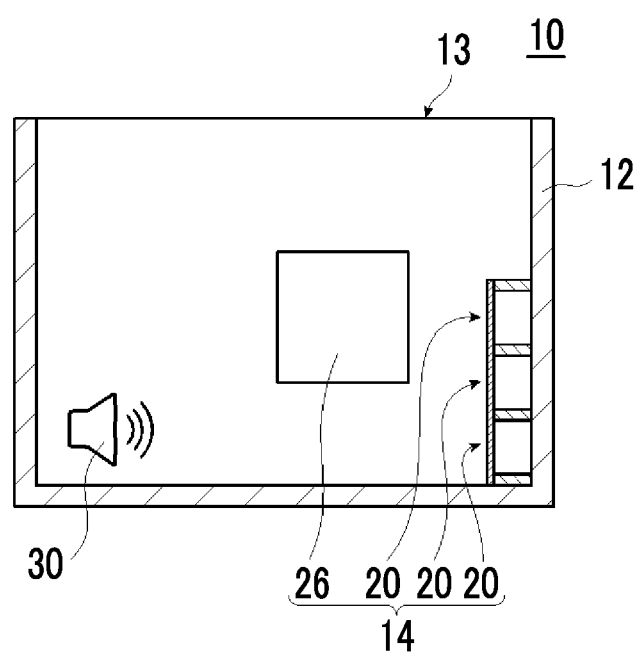
FIG. 14 is a cross-sectional view schematically showing still another example of the box-shaped soundproof structure.

Here, in the example shown in FIG. 1 and the like, the sound reduction structure 14 is configured to include only the plurality of resonators 20, but is not limited thereto, and may include one resonator 20. In addition, sound reduction means other than the resonator 20 may be provided. For example, as in the example shown in FIG. 14, the sound reduction structure 14 may be configured to include a plurality of resonators 20 and a porous sound absorbing body 26.

In a case where the sound reduction structure 14 includes a plurality of resonators 20, the plurality of resonators 20 may be individually produced and fixed to each other, or the plurality of resonators 20 may be integrally formed. For example, in a case of the membrane type resonator shown in FIG. 1 and the like, the frames 18 of the plurality of resonators 20 may be integrally formed.

In addition, in the example shown in FIG. 1 and the like, the sound source 30 is disposed in the box 12, but the disposed position of the sound source 30 in the box 12 is not particularly limited.

Figure 15:
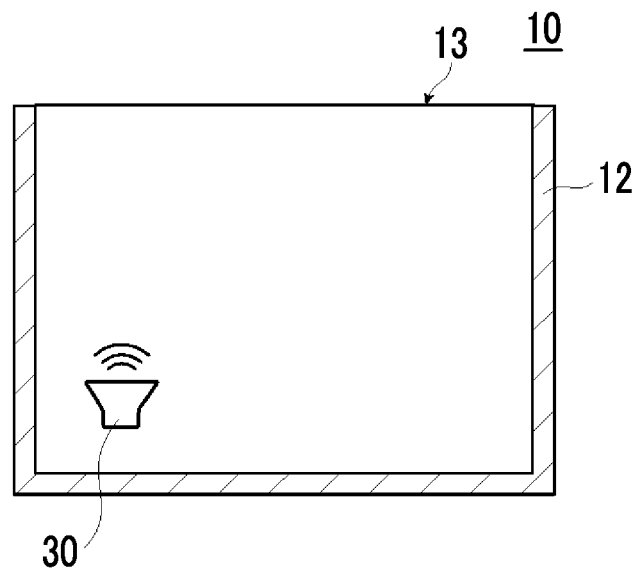
FIG. 15 is a cross-sectional view for explaining a disposed position of a sound source.
Figure 16:
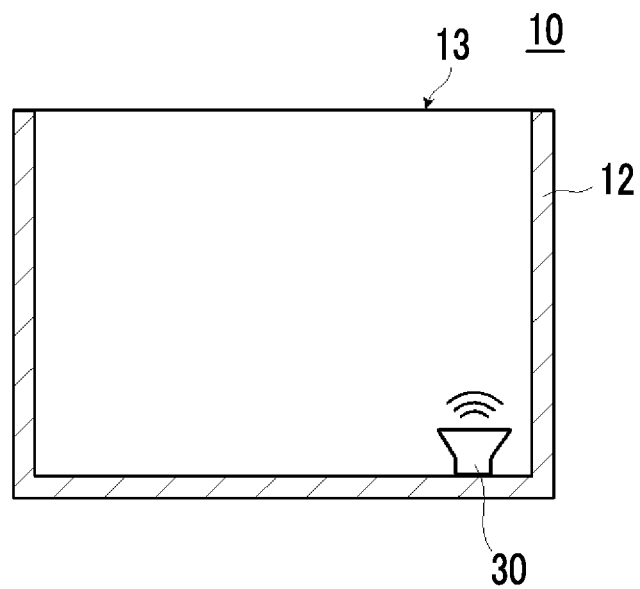
FIG. 16 is a cross-sectional view for explaining a disposed position of the sound source.

For example, as shown in FIG. 15, the sound source 30 may be disposed in the box 12 at a position not in contact with the inner wall surface of the box 12. Alternatively, as shown in FIG. 16, the sound source 30 may be disposed in the box 12 at a position in contact with the inner wall surface of the box 12.

Figure 17:
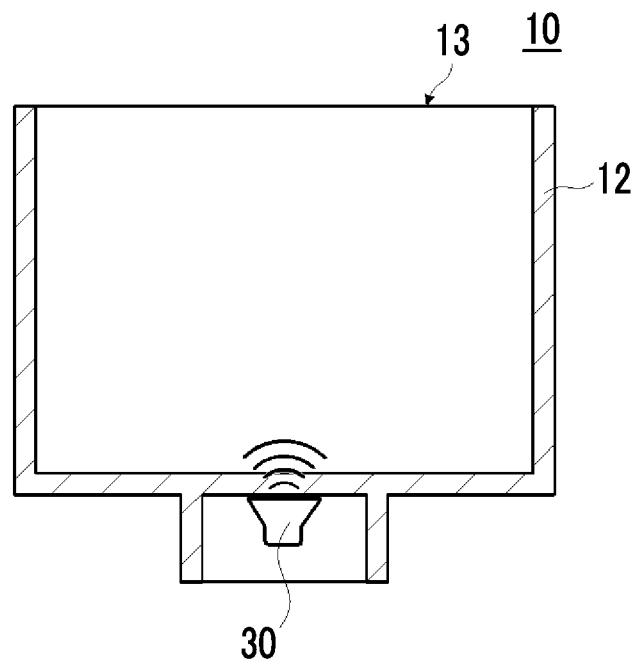
FIG. 17 is a cross-sectional view for explaining a disposed position of the sound source.

Alternatively, as shown in FIG. 17, the sound source 30 may be disposed in contact with the outer wall surface of the box 12. In a case where the sound source 30 is disposed in contact with the outer wall surface of the box 12, the sound emitted from the sound source 30 can be transmitted to the wall and emitted through the inside of the box 12.

In addition, in a case where the sound source 30 is disposed toward the inner wall surface 12 and a wavelength of a sound to be reduced is set as $\lambda$, even in a case where a distance between the sound source 30 and the inner wall surface of the box 12 is $\lambda/2$ or more, the sound can be reduced by the effect of the invention.

In a case where the sound source 30 is disposed toward the inner wall surface 12, in a case where the distance thereof is less than $\lambda/2$ and a distance of a waveguide to the open surface is also less than $\lambda/2$, a plane wave is only allowed for a guided sound mode due to a cut-off of the waveguide mode. In that case, since sound that bends from the sound source and is guided to the outside is less likely to be generated, the transmission sound that originally reaches the open surface is reduced. The invention can also be applied to such a case, but this configuration imposes restrictions on all of the size of the open portion, a duct diameter from the sound source to the open portion, and the disposition of the sound source.

The invention is not limited to this, and can also be applied to a case where at least one of a distance between the sound source and the wall or a distance of the waveguide has a size of $\lambda/2$ or more. Therefore, in the invention, the size of the open portion, the duct diameter from the sound source to the open portion, and the disposition of the sound source are not limited, and these can be applied to a general open box to prevent sound emission.

A direction of the sound source 30 (emission direction of sound) in the box 12 is not particularly limited, either.

For example, as shown in FIG. 1 and the like, the sound source 30 may be disposed so that a sound emission direction is towards the inner wall surface of the box 12, or as shown in FIG. 15 and FIG. 16, a sound emission direction may be disposed so as to be towards the open portion 13 of the box 12.

In addition, in the example shown in FIG. 1 and the like, the box 12 includes one open portion 13, but is not limited thereto, and may have two or more open portions. Further, in the example shown in FIG. 1 and the like, the box 12 has one surface where the open portion 13 entirely opened is provided, but there is no limitation thereto, and a part of one surface may be opened.

Figure 18:
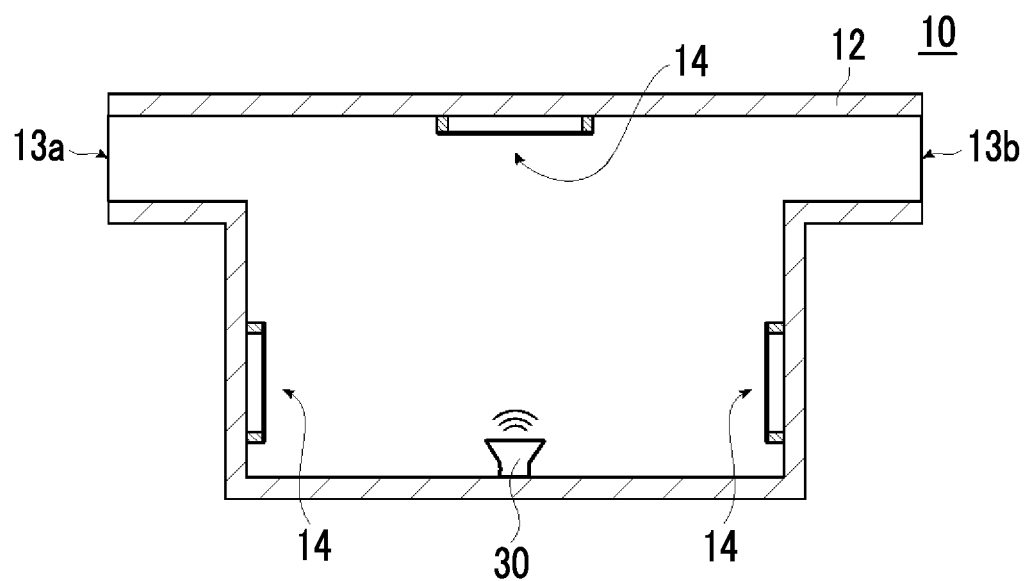
FIG. 18 is a cross-sectional view schematically showing still another example of the box-shaped soundproof structure.

For example, in the example shown in FIG. 18, the box 12 has open portions 13 $a$ and 13 $b$ that are partially open on each of two facing surfaces, and the sound source 30 and three sound reduction structures 14 are disposed in the box 12. The open portion 13a and the open portion 13b are formed at positions facing each other.

The sound source 30 is disposed at a middle position between the open portion 13a and the open portion 13b and on a surface far from the open portion. One of the sound reduction structures 14 is disposed at a middle position between the open portion 13a and the open portion 13b and on a surface close to the open portion. The other two sound reduction structures 14 are respectively disposed on surfaces on which the open portions 13a and 13b are formed.

Figure 19:
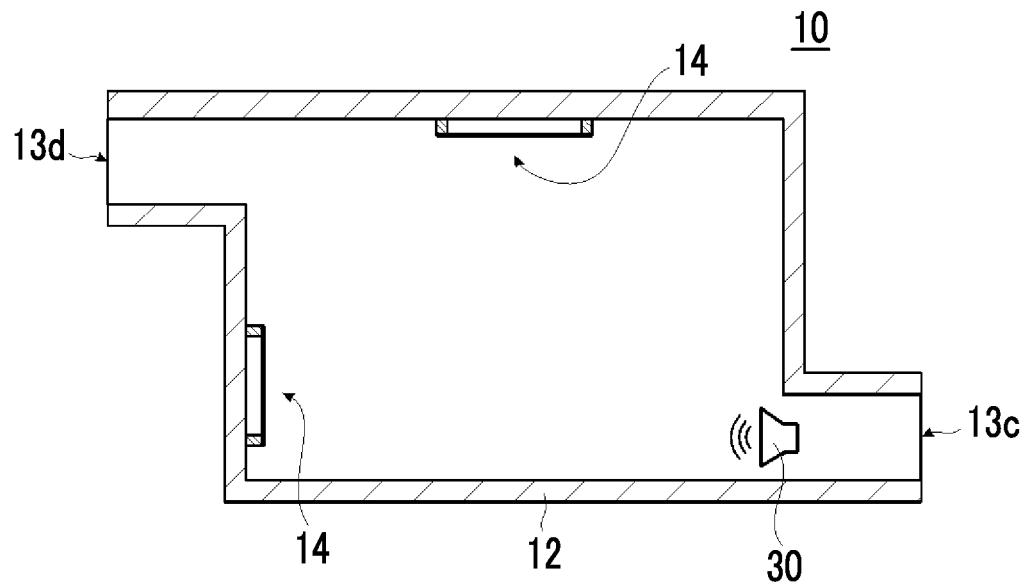
FIG. 19 is a cross-sectional view schematically showing still another example of the box-shaped soundproof structure.

In the example shown in FIG. 19, the box 12 has open portions 13c and 13d partially open on each of two facing surfaces, and the sound source 30 and two sound reduction structures 14 are disposed in the box 12. The open portion 13c and the open portion 13d are formed at positions not facing each other.

The sound source 30 is disposed at a position close to the open portion 13c. One of the sound reduction structures 14 is disposed on a surface facing the open portion 13c. The other one of the sound reduction structures 14 is a surface on which no open portion is formed, and is disposed on a surface far from the open portion 13c.

Figure 20:
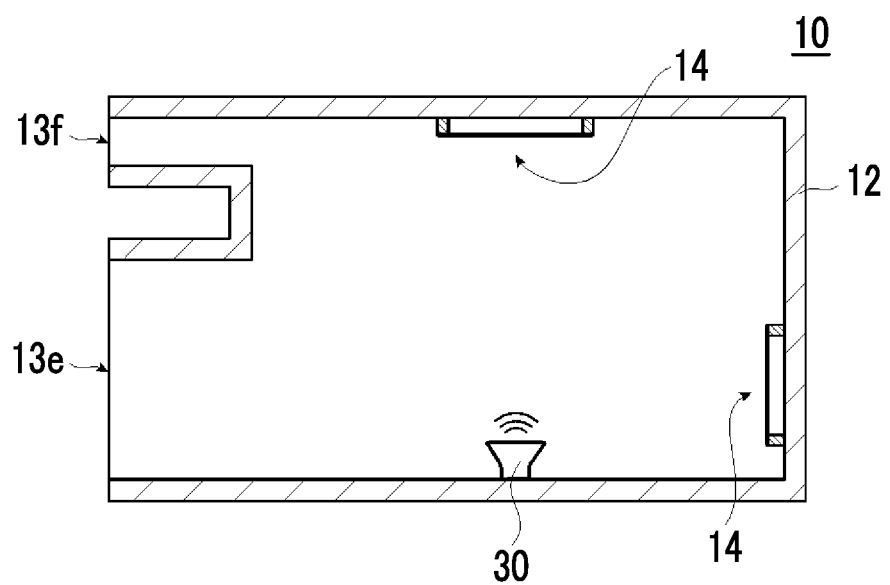
FIG. 20 is a cross-sectional view schematically showing still another example of the box-shaped soundproof structure.

In the example shown in FIG. 20, the box 12 has two open portions 13e and 13f on one surface, and the sound source 30 and the two sound reduction structures 14 are disposed in the box 12. The open portion 13e and the open portion 13f have different sizes.

The sound source 30 is disposed on a surface on which no open portions are formed and on a surface close to the open portion 13e. One of the sound reduction structures 14 is disposed on a surface facing the open portion 13e. The other one of the sound reduction structures 14 is disposed on a surface facing the surface on which the sound source 30 is disposed.

In examples shown in FIGS. 18 to 20, for example, two open portions are provided for intake and exhaust. Alternatively, two or more open portions are provided for design or symmetry, for increasing an opening ratio, or for having openings for different purposes.

As described above, in a case where the box 12 has two or more open portions, the disposed position of the sound reduction structure 14 (resonator 20) in the box 12 may be, for example, set to be a position of an antinode of the sound that resonates in the box 12, by a simulation or an experiment in advance.

In addition, a configuration in which an air-permeable member is attached to a part or the entire part of the open surface of the box. That is, the open portion may be partially or entirely covered by a member having air permeability. The air-permeable member tends to transmit air and sound, and the sound often leaks from a portion covered by the air-permeable member. As the air-permeable member, a nonwoven fabric, a woven fabric, a frame, an air-permeable membrane, or various porous sound absorbing bodies which will be described later can be used. By using a porous sound absorbing body as the air-permeable member, the soundproofing effect of the entire box-shaped soundproof structure can also be enhanced.

In addition, depending on the structure of the air-permeable member, heat, a dirt, a light amount, and the like in the box can also be adjusted.

The box-shaped soundproof structure of the invention also exhibits the effect for a box in which an open surface is partially or entirely covered with such an air-permeable member.

As described above, a housing of various devices such as electronic devices and a transportation apparatus having a sound source therein, or a part of the housing can be regarded as a box, but the invention is not limited thereto, and the box may be separated from these housings.

In addition, the box-shaped soundproof structure having the box and the sound reduction structure can be detachably attached to the sound source and may be disposed to surround the sound source. For example, the box-shaped soundproof structure 10 having the sound reduction structure 14a in the portable box 12 can be disposed to cover the sound source 30. The portable box-shaped soundproof structure may be fixed around the sound source with screws or double-sided tape. By doing so, it is possible to effectively exhibit the sound reduction effect after finding the noise as a problem.

For example, the box-shaped soundproof structure can be used by covering a speaker, an electric motor, an inverter, or a fan with the structure.

A shape of the box 12 is not particularly limited and may be a shape corresponding to the above-described various electronic devices, a transportation apparatus, and the like. Among them, the shape of the box 12 is preferably a substantially rectangular parallelepiped, because the wall is flat so that the sound reduction structure 14 is easily disposed, and the corner is configured with straight lines so that the sound reduction structure 14 is easily disposed.

In a case where the box is installed later with respect to the sound source, it is necessary to install the box to have an open surface.

Figure 36:
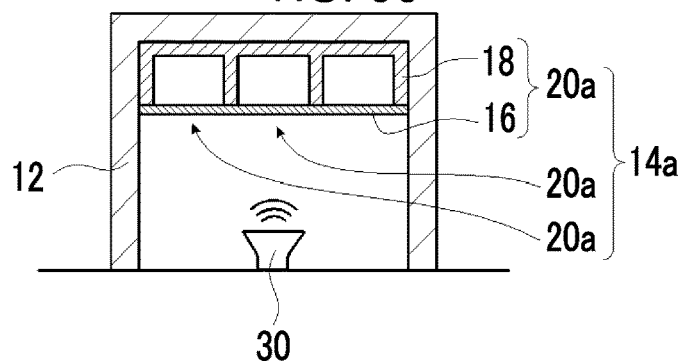
FIG. 36 is a schematic cross-sectional view of still another example of the box-shaped soundproof structure of the invention.

Accordingly, the box 12 may have, for example, a configuration in which upper and lower surfaces of a cube are open. Alternatively, as shown in FIG. 36, a configuration in which a total of three surfaces of two facing surfaces and one surface between these two surfaces are opened, that is, a t shape may be used.

Further, for example, there is no particular limitation on the disposed position of the sound reduction structure in a case where the box has a configuration in which the upper and lower surfaces of the cube are open. For example, a box-shaped soundproof structure may be formed by disposing resonance structures on four surfaces. As described above, box-shaped soundproof structures having an open surface can be realized by producing the box-shaped soundproof structures in various shapes according to the shape around the sound source, and performing the covering.

The material of the box 12 is not particularly limited, and may be a material for the above-described various electronic devices, a transportation apparatus, and the like.

In addition, in a case where the box is used in a form to cover the sound source, various materials can be selected from a viewpoint of durability, lightness, or heat. Specifically, the material can be selected in the same manner as for the materials of the frame 18, the container 17, and the resonance tube 19 which will be described later.

Examples of the material of the frame 18, the container 17, and the resonance tube 19 include a metal material, a resin material, a reinforced plastic material, and a carbon fiber. Examples of the metal material include metal materials such as aluminum, titanium, magnesium, tungsten, iron, steel, chromium, chromium molybdenum, nichrome molybdenum, and alloys thereof. Examples of the resin material include resin materials such as an acrylic resin, polymethyl methacrylate, polycarbonate (PC), polyamideide, polyarylate, polyetherimide, polyacetal, polyetheretherketone, polyphenylenesulfide, polysulfone, polyethylene (PE), polyethylene, terephthalate (PET), polybutylene terephthalate, polyimide, an ABS resin (acrylonitrile-butadiene-styrene copolymerized synthetic resin), polypropylene (PP), and triacetyl cellulose. Examples of the reinforced plastic material include carbon fiber reinforced plastics (CFRP) and glass fiber reinforced plastics (GFRP).

In addition, various honeycomb core materials can be used as materials for the frame, the container, and the resonance tube. Since the honeycomb core material is used as a lightweight and highly-rigid material, ready-made products are easily available. The honeycomb core material formed of various materials such as an aluminum honeycomb core, a Fiber-Reinforced Plastics (FRP) honeycomb core, a paper honeycomb core (manufactured by Shin Nippon Feather Core Co., Ltd. and Showa Aircraft Industry Co., Ltd.), a thermoplastic resin (PP, PET, PE, or PC), and a honeycomb core (TECCELL manufactured by Gifu Plastics Industry Co., Ltd.).

Here, the frame 18, the container 17, and the resonance tube 19 are preferably formed of a material having higher heat resistance than a flame-retardant material, because it is usable for an exhaust port. The heat resistance can be defined, for example, by a time to satisfy Article 108-2 of the Building Standard Law Enforcement Order. In a case where the time to satisfy Article 108-2 of the Building Standard Law Enforcement Order is 5 minutes or longer and shorter than 10 minutes, it is defined as a flame-retardant material, in a case where the time is 10 minutes or longer and shorter than 20 minutes, it is defined as a quasi-noncombustible material, and in a case where the time is 20 minutes or longer, it is defined as a noncombustible material. However, heat resistance is defined for each field in many cases. Therefore, in accordance with the field in which the box-shaped soundproof structure is used, the frame 18, the container 17, and the resonance tube 19 may be formed of a material having heat resistance equivalent to or higher than flame retardance defined in the field.

An outer shape of the container 17 and the resonance tube 19 is not particularly limited and may be, for example, a rectangular parallelepiped shape, a cube shape, a pyramid shape, a prism shape, a conical shape, a cylindrical shape, a spherical shape, or an indeterminate shape. In a case where the inner wall of the box 12 is not a horizontal plane such as having a curvature, it is desirable to determine the outer shapes of the container 17 and the resonance tube 19 according to the inner wall shape, from a viewpoint of installation on the inner wall.

A shape of the hollow portion of the container 17 and the resonance tube 19 is not particularly limited, and may be, for example, a rectangular parallelepiped shape, a cubic shape, a pyramid shape, a prism shape, a conical shape, a cylindrical shape, a spherical shape, or an indeterminate shape.

Sizes ($L_d$ and $L_c$ in FIG. 8, $L_e$ and $L_f$ in FIG. 10), thicknesses ($t_2$ in FIG. 8, $t_3$ in FIG. 10), and the like of the container 17 and the resonance tube 19 are not particularly limited, and may be suitably set according to the required sizes and the like.

A shape of an opening cross section of the frame 18 is not particularly limited and may be, for example, a polygon including a square such as a square, a rectangle, a rhombus, or a parallelogram, a triangle such as a regular triangle, an isosceles triangle, or a right triangle, a regular polygon such as a regular pentagon or a regular hexagon, a circle, an ellipse, or an indeterminate shape.

A thickness (frame thickness, $t_1$ in FIG. 4) and a thickness (height in a direction perpendicular to the open surface, $L_b$ in FIG. 4) of the frame 18 is not particularly limited, as long as the membrane-like member 16 can be reliably fixed and supported, and can be, for example, set according to the size of the opening cross section of the frame 18.

Examples of the material of the membrane-like member 16 include various metal such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and resin materials such as polyethylene terephthalate (PET), triacetyl cellulose (TAC), polyvinylidene chloride (PVDC), polyethylene (PE), polyvinyl chloride (PVC), polymethylpentene (PMP), a cycloolefin polymer (COP), ZEONOR, polycarbonate, polyethylene naphthalate (PEN), polypropylene (PP), polystyrene (PS), polyarylate (PAR), aramid, polyphenylene (PPS), polyethersulfone (PES), nylon, polyester (PEs), a cyclic and olefin copolymer (COC), diacetylcellulose, nitrocellulose, cellulose derivatives, polyamide, polyamideimide, polyoxymethylene (POM), polyether imide (PEI), polyrotaxane (such as a slide ring material), and polyimide. In addition, a glass material such as thin film glass, and a fiber reinforced plastic material such as carbon fiber reinforced plastic (CFRP) and glass fiber reinforced plastic (GFRP) can also be used. Alternatively, a combination thereof may be used.

In a case of using a metal material, the surface may be plated with metal from a viewpoint of preventing rust and the like.

In addition, the metal is preferably used as the material of the membrane-like member, from viewpoints of excellent durability (heat, ozone, ultraviolet rays, water, or humidity), non-generation of static electricity, usability even near a heat source due to ability to shield radiant heat, and protection of the porous sound absorbing body or the like disposed on a lower portion of the metal membrane from heat.

A Young's modulus of the membrane-like member 16 is not particularly limited as long as the membrane vibration can be performed. The Young's modulus of the membrane-like member 16 is preferably from 1,000 Pa to 3,000 GPa, more preferably from 10,000 Pa to 2,000 GPa, and most preferably from 1 MPa to 1,000 GPa.

In addition, a density of the membrane-like member 16 is not particularly limited, as long as the membrane vibration can be performed. The density of the membrane-like member 16 is preferably 10 $kg/m^3$ to 30,000 $kg/m^3$, more preferably 100 $kg/m^3$ to 20,000 $kg/m^3$, and most preferably 500 $kg/m^3$ to 10,000 $kg/m^3$.

A thickness of the membrane-like member 16 is not particularly limited, as long as the membrane vibration can be performed. For example, the thickness of the membrane-like member 16 is preferably 0.005 mm (5 μm) to 5 mm, more preferably 0.007 mm (7 μm) to 1 mm, and 0.01 mm (10 μm) to 0.3 mm (300 μm), and most preferably 0.01 mm (10 μm) to 0.2 mm (200 μm).

In addition, the membrane thickness is preferably small, in a case where it is desired to enhance the sound absorbing effect using the high-order vibration of the membrane-like member 16. The membrane thickness is preferably less than 100 μm, more preferably 70 μm or less, and most preferably 50 μm or less.

The method for fixing the membrane-like member 16 to the frame 18 is not particularly limited, and a method using a single-sided tape or a double-sided tape or an adhesive or a pressure-sensitive adhesive, a mechanical fixing method such as screwing, pressure bonding, and heat fusion welding can be suitably used.

In addition, by selecting a transparent member such as a resin material for both the frame 18 and the membrane-like member 16, the sound reduction structure 14 itself can be made transparent. For example, a transparent resin such as PET, acryl, or polycarbonate may be selected. Since a general porous sound absorbing material may not prevent scattering of visible light, it is specificity that a transparent sound reduction structure can be realized.

In addition, an antireflection coating or an antireflection structure may be provided on the frame 18 or the membrane-like member 16. For example, an antireflection coating using optical interference by a dielectric multilayer film can be formed. By preventing the reflection of visible light, the visibility of the frame 18 or the membrane-like member 16 can be further reduced and made inconspicuous.

In a case where at least a part of the box 12 is configured with a transparent material and the transparent soundproof structure 14 is disposed on that portion, the inside of the box can be seen from outside. For example, a structure having sound absorbing properties can be used instead of a window member.

In addition, the frame 18 or the membrane-like member 16 may have a heat shielding function. Generally, a metallic material reflects both near-infrared rays and far-infrared rays, and accordingly, radiant heat conduction can be prevented. In addition, even in a case of a transparent resin material or the like, it is possible to reflect only the near-infrared rays while keeping it transparent by providing a heat shielding structure on a surface thereof. For example, the near-infrared rays can be selectively reflected while transmitting visible light by a dielectric multilayer structure. Specifically, multilayer Nano series such as Nano90s manufactured by 3M reflect the near-infrared rays with a layer configuration of more than 200 layers, and accordingly, such a structure can be bonded to a transparent resin material and used as the frame or the membrane-like member, or this member itself may be used as the membrane-like member 16. For example, as a substitute for the window member, a structure having sound absorbing properties and heat shielding properties can be used.

The membrane-like member 16 can be painted or decorated by a method such as ink jet. In general, a decorating member is smaller than the membrane-like member 16 in terms of the hardness and the weight, and accordingly, a color or a pattern can be variously changed without substantially changing the sound absorbing properties.

For example, a pattern can be provided according to the pattern of the wall.

The porous sound absorbing body is not limited, and various well-known porous sound absorbing bodies used for soundproofing can be used. Examples thereof include sound absorbing materials such as a foamed material such as urethane foam, soft urethane foam, wood, a ceramic particle sintered material, or phenol foam, and a material containing minute air, such as aerogel; a fiber such as glass wool, rock wool, microfiber (such as THINSULATE manufactured by 3M), a floor mat, a carpet, a melt blown nonwoven, a metal nonwoven fabric, a polyester nonwoven, metal wool, felts, an insulation board, and glass nonwoven, and nonwoven materials; a wood wool cement board; a nanofiber material such as a silica nanofiber; a gypsum board; and a laminated material or a composite material thereof.

In a system in which an environmental temperature changes, it is desirable that both the material of the frame 18 and the material of the membrane-like member 16 have a small change in physical properties with respect to the environmental temperature.

For example, in a case of using a resin material, it is desirable to use a material having a point at which a significant change in physical properties is caused (glass transition temperature, melting point, or the like) that is beyond the environmental temperature range.

In addition, in a case where different materials are used for the frame and the membrane-like member, it is desirable that thermal expansion coefficients (linear thermal expansion coefficients) at the environmental temperature are substantially the same.

In a case where the thermal expansion coefficients are greatly different between the frame and the membrane-like member, an amount of displacement between the frame and the membrane-like member changes in a case where the environmental temperature changes, and accordingly, a distortion easily occurs on the membrane-like member. Since a distortion and a tension change affect the resonance frequency of the membrane, a sound reduction frequency easily changes according to a temperature change, and even in a case where the temperature returns to the original temperature, the sound reduction frequency may remain as changed, without reducing the distortion.

In contrast, in a case where the thermal expansion coefficients are substantially the same, the frame and the membrane-like material expand and contract in the same manner with respect to a temperature change, so that the distortion hardly occurs, thereby exhibiting sound reduction properties stable with respect to a temperature change.

The coefficient of thermal expansion can be measured by a well-known method such as JIS K7197, and members can be selected in any combination according to the environmental temperature at which the members will be used.

As described above, the box-shaped soundproof structure of the invention can be suitably used in a case where at least one of an electric motor or an inverter that generate loud noise at a natural frequency is used as a sound source.

In addition, as described above, in a hybrid vehicle and an electric vehicle, an electric motor and an inverter are often used, which is a problem as a noise source. Therefore, in a transportation apparatus including automobiles, at least one of an electric motor or an inverter is set as a sound reduction target, and a box-shaped soundproof structure is preferably disposed in the transportation apparatus so as that the sound source which is the sound reduction target comes into contact with the box or disposed in the box.

In addition, in a case where the box-shaped soundproof structure of the invention is used for transportation apparatus, it is preferable to dispose the box-shaped soundproof structure so that the sound reduction structure is disposed at a position intercepting a straight line connecting a position of the sound source and a position of the seat in the transportation apparatus. Therefore, the effect of sound reduction can be further improved.

Hereinabove, the box-shaped soundproof structure of the invention have been described in detail with various embodiments, but the invention is not limited to these embodiments, and various modifications or changes may be made without departing from a gist of the invention.

EXAMPLES

Hereinafter, the invention will be described in more detail based on examples. The materials, amounts used, ratios, processing details, processing procedures, and the like shown in the following examples can be suitably changed without departing from the gist of the invention. Therefore, the scope of the invention should not be construed as being limited by the following examples.

<Explanation of Experimental System>

An acrylic cubic box having an internal space of 300 mm on a side was prepared. An acryl thickness was 10 mm, and accordingly, a sound was sufficiently reflected. A cube having only one side open was used as a box.

Figure 21:
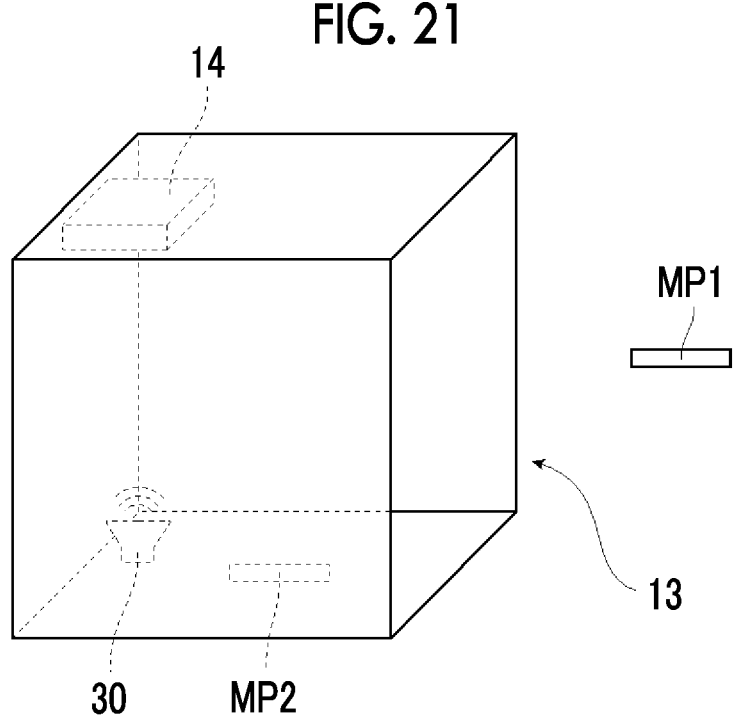
FIG. 21 is a schematic perspective view for explaining an experimental system of an example.
Figure 22:
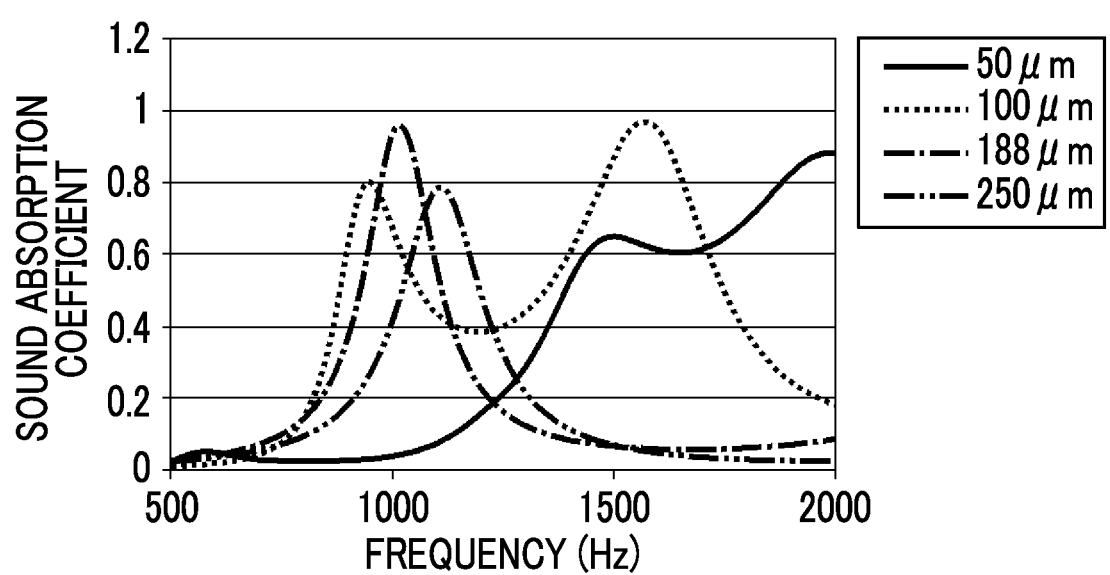
FIG. 22 is a graph showing a relationship between a frequency and a sound absorption coefficient.
Figure 23:
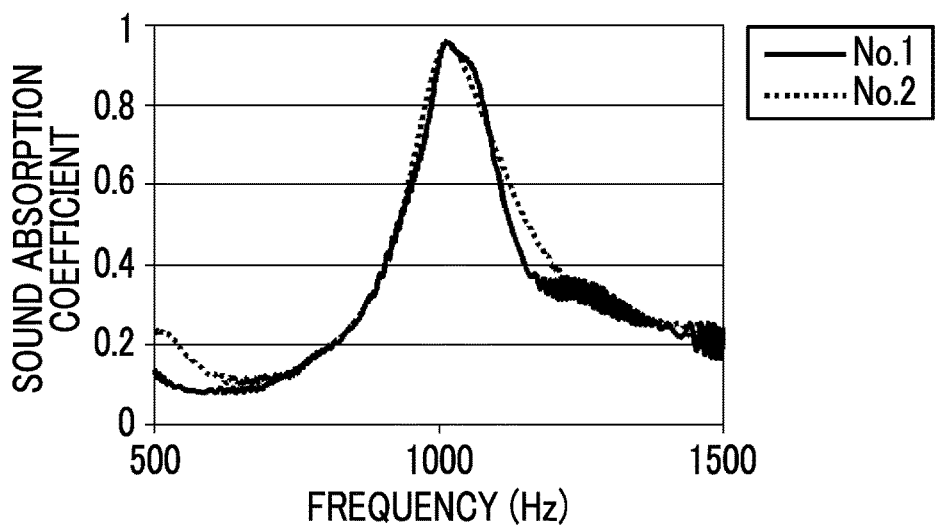
FIG. 23 is a graph showing a relationship between a frequency and a sound absorption coefficient.

As shown in FIG. 21, a speaker (SRS-XB10 manufactured by Sony Corporation) was arranged as a sound source 30 in the box 12. The disposed position was a position in contact with a surface facing the open portion 13.

The speaker 30 is operated to generate white noise and sound pressure at each frequency was measured. The sound pressure was measured by disposing a microphone MP1 (Microphone 4152N manufactured by Accor Corporation) at a position 200 mm away from the center of the open portion 13. A sound-absorbing urethane (not shown) having a thickness of 200 mm was disposed on a rear and side surfaces so as to surround the box 12 and the microphone MP1, thereby preventing the influence of reflected sound in the measurement environment.

<Resonator Design>

A membrane type resonator was designed as the resonator. The design of the membrane type resonator was performed using an acoustic module of finite element method calculation software COMSOL ver.5.3 (COMSOL Inc.). A structure in which the thickness $L_b$ of the inner portion of the frame and the size of the open portion ($L_a \times L_a$) were determined, an edge of the membrane-like member was fixed on one side of the open surface, and a rigid body wall existed on the other side, was obtained. That is, the resonator in which a closed space existed on the rear surface of the membrane-like member that vibrates like a drum was obtained.

Regarding a resonator in which a membrane-like member formed of a PET film as a material and having thickness of 50 μm, 100 μm, 188 μm, and 250 μm was disposed on an open surface of a square frame having an inner portion thickness $L_b$ of 10 mm and an open portion size ($L_a \times L_a$) of 30 mm×30 mm, each of frequency properties of a sound absorption coefficient were calculated by simulation. The results thereof are shown in FIG. 21.

From the results shown in FIG. 21, a PET film having a thickness of 188 μm was selected as a 1 kHz resonator.

<Production of Resonator>

Next, the above-designed resonator (sound reduction structure) was produced.

The frame was produced by processing an acrylic plate into a frame structure using a laser cutter. The thickness was set as 10 mm, the open portion size was set as 30 mm×30 mm, and the frame thickness of the frame was set as 5 mm. A frame structure having a total of 16 open portions of 4×4 was manufactured. A double-sided tape (GENBA NO CHIKARA manufactured by ASKUL Corporation) was attached to one surface of the frame. A PET film having a thickness of 188 μm (Lumirror manufactured by Toray Industries, Inc.) was attached as a membrane-like member to fix the edge. A double-sided tape was attached to the other surface of the frame in the same manner, and an acrylic plate having a thickness of 2 mm was attached thereto as a rigid body wall, thereby manufacturing a membrane type resonator.

<Evaluation of Resonator>

In order to confirm that the manufactured resonator absorbs a sound at a target frequency (1 kHz), a sound absorption coefficient was evaluated using an acoustic tube. The evaluation was performed by producing a measurement system for the normal incidence sound absorption coefficient based on JIS A 1405-2. The same measurement can be performed using WinZacMTX manufactured by Japan Acoustic Engineering. A diameter of the acoustic tube was set as 80 mm, and a resonator was disposed at the end of the acoustic tube with the membrane-like member facing up, and the sound absorption coefficient was evaluated.

FIG. 2 shows a result obtained by the evaluation by manufacturing two samples (No. 1 and No. 2). It is found that both samples show high sound absorption coefficients at the target frequency of 1 kHz.

As described above, by performing the designing, the manufacturing, and the evaluation of the resonator, various types of resonators (resonators A to E) used in the following examples were manufactured.

Table 1 shows specifications of the resonators manufactured for frequencies of 1 kHz, 2 kHz and 4 kHz.

In Table 1, the material OPP of the membrane-like member is an OPP film, which is a biaxially stretched polypropylene film (Pyrene® film-OT manufactured by Toyobo Co., Ltd.).

TABLE 1

| | | Frame | | Membrane-like member | |
| | | Open portion | inner portion | | |
| | Frequency | size (mm × mm) | thickness (mm) | Thickness (μm) | Material |
|---|---|---|---|---|---|
| Resonator A | 1 kHz | 30 × 30 | 10 | 188 | PET |
| Resonator B | 2 kHz | 30 × 30 | 5 | 100 | PET |
| Resonator C | 4 kHz | 20 × 20 | 3 | 50 | PET |
| Resonator D | 2 kHz | 20 × 20 | 10 | 60 | OPP |
| Resonator E | 4 kHz | 20 × 20 | 5 | 60 | OPP |

Example 1

The resonator (sound reduction structure) manufactured above was disposed in the box of the experimental system, and the effect of preventing the sound radiated from the open surface of the box was measured.

First, a radiated sound volume was measured and set as a reference under the condition that no resonator (sound reduction structure) was disposed in the above-described experimental box.

Figure 24:
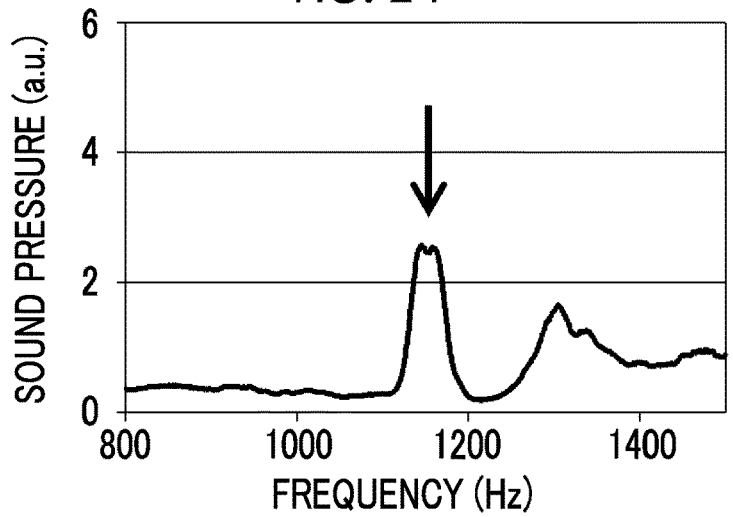
FIG. 24 is a graph showing a relationship between a frequency and sound pressure.

Here, since the size of the inner portion of the box 12 is close to a wavelength length of the audible range, a mode is generated in the box 12, and the radiated sound volume is different for each frequency. As shown in FIG. 21, a microphone MP2 was disposed in the box 12 to measure the sound pressure therein. FIG. 24 shows the measurement results.

From FIG. 24, it was found that the sound pressure increased at a wavelength near 1150 Hz and a strong mode is generated at this frequency in this box 12. It was also found by the microphone MP1 installed outside the box 12, that a loud radiated sound was emitted at frequencies near this frequency.

Next, the sound reduction structure 14 having 4×4 resonators A manufactured for 1 kHz was disposed in the box 12. The disposed position was a position in contact with a surface facing the open portion 13 and faced the speaker 30 at the corner. The sound reduction structure 14 was bonded to the inner wall of the box 12 with a double-sided tape for measurement.

Based on the radiated sound volume of the reference, an amount of reduction in the radiated sound volume, in a case where the sound reduction structure was disposed, was evaluated as a small sound volume in the dB unit. That is, in a case where no sound reduction structure was provided, the sound pressure was set as P0 and in a case where the sound reduction structure was provided, the sound pressure was set as P1. A sound reduction volume was evaluated as 20×log 10 (P0/P1). The results thereof are shown in FIG. 25.

Figure 25:
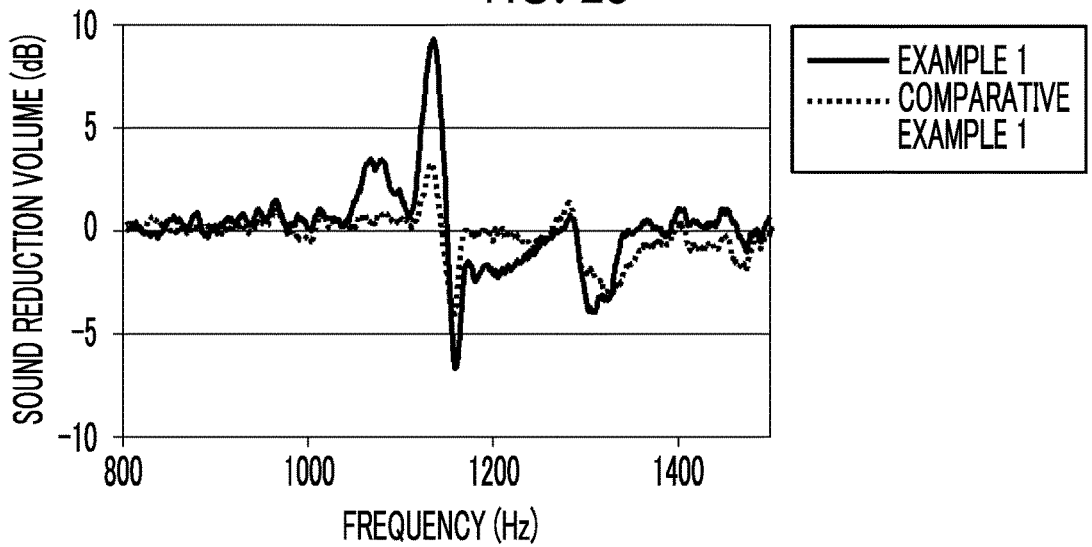
FIG. 25 is a graph showing a relationship between a frequency and a sound reduction volume.

From FIG. 25, it was clarified that at 1150 Hz which is near the resonance frequency, a sound reduction volume of 9 dB was shown.

Comparative Example 1

An acrylic plate (thickness of 12 mm, size of 130 mm×130 mm) having the same size as that of the sound reduction structure of Example 1 was disposed in the same position in the box as the disposed position of the sound reduction structure of Example 1. The sound reduction volume was measured in the same manner as in Example 1. The results thereof are shown in FIG. 25.

From FIG. 25, it is found that, since a strong mode is generated in a state where no sound reduction structure is disposed in the box, a sound reduction volume of 3 dB is obtained, even in a case where a simple plate is merely disposed in the box, as in Comparative Example 1.

However, from the comparison between Example 1 and Comparative Example 1, it is found that, the membrane type resonator (sound reduction structure) of Example 1, which has the same size but much lighter weight (weight is about 39% as compared with the plate), shows a significantly great sound reduction volume. As described above, in the box-shaped soundproof structure of the invention, the membrane type resonator can function effectively to reduce a specific sound.

Example 2

The evaluation of the sound reduction volume was performed in the same manner as in Example 1 except that the resonator A was changed to a resonator B (a resonator for 2 kHz).

Figure 26:
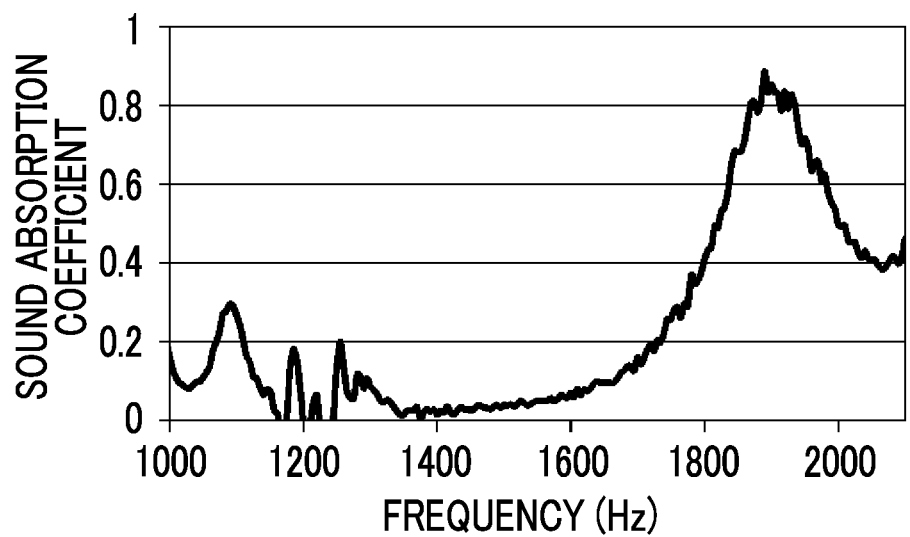
FIG. 26 is a graph showing a relationship between a frequency and a sound absorption coefficient.
Figure 27:
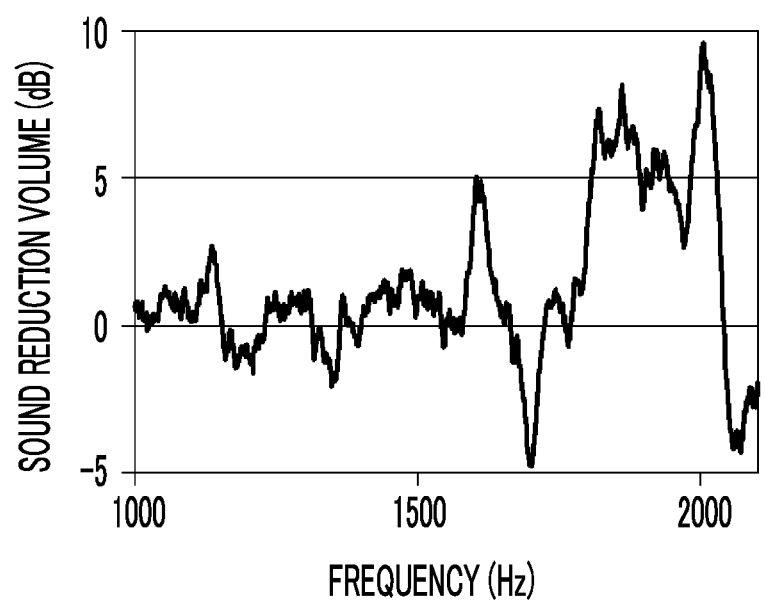
FIG. 27 is a graph showing a relationship between a frequency and a sound reduction volume.

FIG. 26 shows the evaluation result of the normal incidence sound absorption coefficient of the resonator B, and FIG. 27 shows the evaluation result of the sound reduction volume.

In the measurement of normal incidence sound absorption coefficient, the evaluation was performed using an acoustic tube having a diameter of 40 mm instead of using an acoustic tube having a diameter of 80 mm, in order to extend an upper limit frequency of the measurement.

From FIG. 27, it is found that a sound reduction volume of 9 dB or more is obtained at frequencies near 2 kHz.

Example 3-1

The evaluation of the sound reduction volume was performed in the same manner as in Example 1 except that the resonator A was changed to a resonator C (a resonator for 4 kHz).

Figure 28:
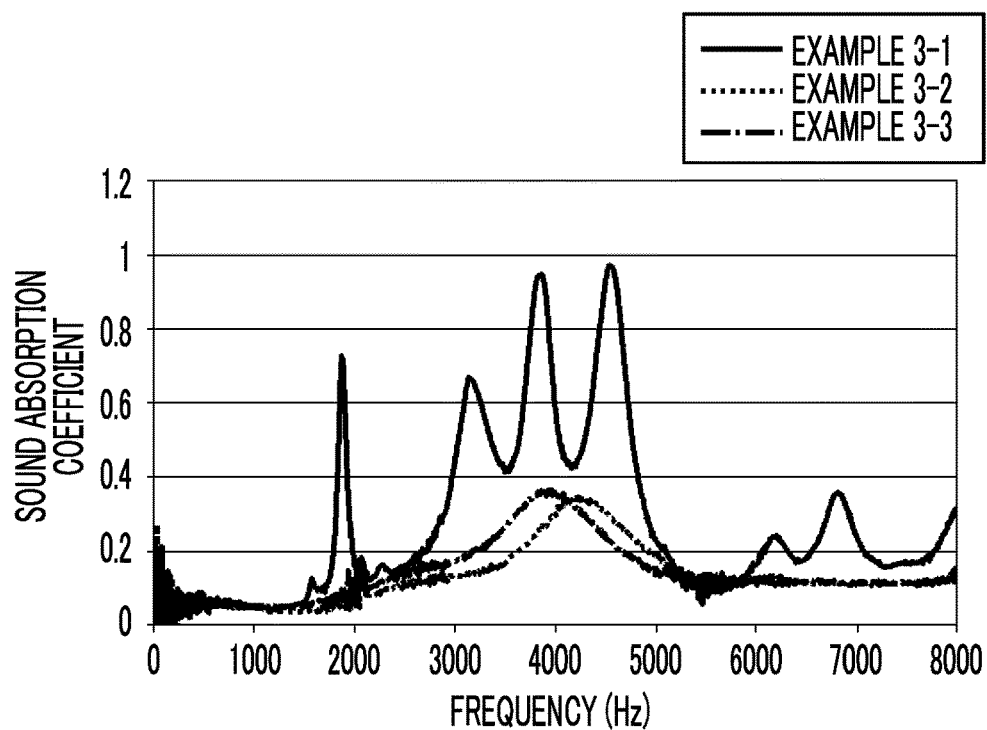
FIG. 28 is a graph showing a relationship between a frequency and a sound absorption coefficient.
Figure 29:
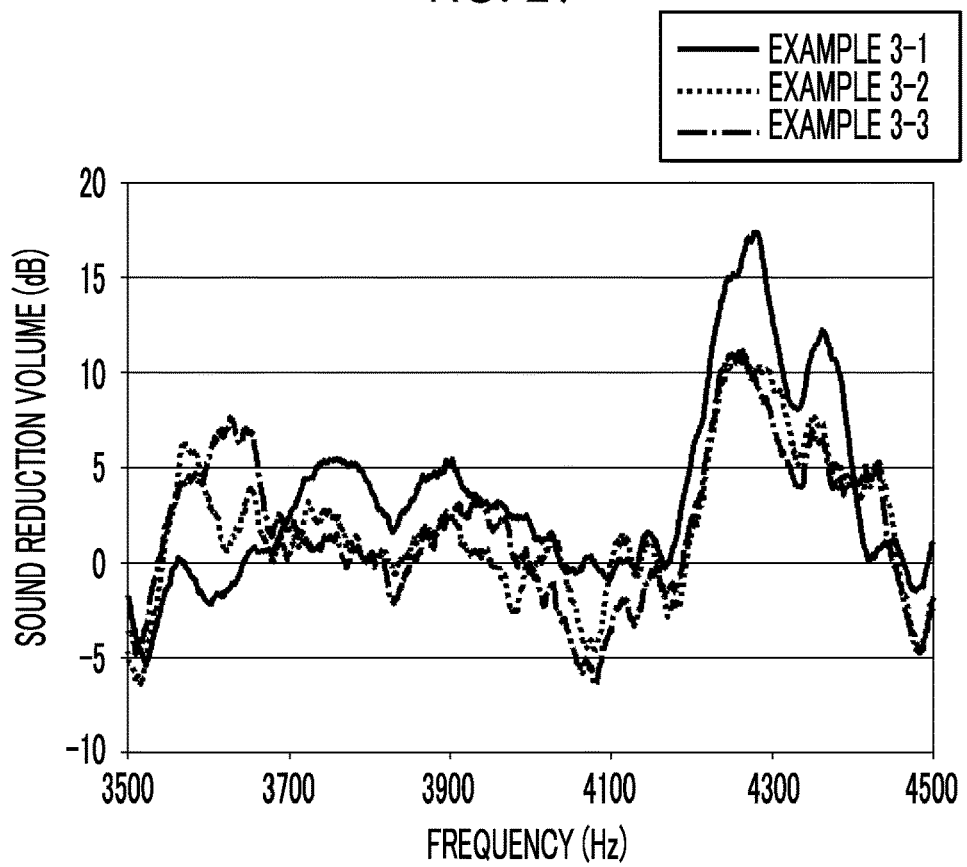
FIG. 29 is a graph showing a relationship between a frequency and a sound reduction volume.

FIG. 28 shows the evaluation result of the normal incidence sound absorption coefficient of the resonator C, and FIG. 29 shows the evaluation result of the sound reduction volume.

In the measurement of normal incidence sound absorption coefficient, the evaluation was performed using an acoustic tube having a diameter of 20 mm instead of using an acoustic tube having a diameter of 80 mm, in order to extend an upper limit frequency of the measurement.

In addition, the measurement of the sound reduction volume was the measurement of the radiated sound volume from the box, and three microphones were disposed and the evaluation was performed using an averaged value thereof, instead of using the result of one microphone. The disposed positions were three positions including a position (ch1) separated from the center of the open portion 13 by 200 mm as in Example 1, a position (ch2) separated from the microphone at ch1 by 100 mm in a direction parallel to the open portion 13 and orthogonal to the direction of the speaker 30, and a position (ch3) separated from the microphone at ch1 by 100 mm in a direction of the speaker 30 which is parallel to the open portion 13. That is, the microphones at ch1, ch2, and ch3 exist in a plane parallel to the open portion 13.

The type of the microphone is the same as the microphone MP1. This measurement method is referred to as a "three-microphone method". Particularly, at high frequencies, the mode of the radiated sound volume becomes finer according to the wavelength size. Therefore, in a case of where an average of a large number of microphones is used, a more accurate result of the radiated sound volume is obtained. In the following examples, basically, the measurement is performed by the one-microphone method as in Example 1, but in a case where the measurement is performed by the three-microphone method, it will be clearly written.

From FIG. 29, it is found that a sound reduction volume of 17 dB or more is obtained at frequencies near 4 kHz (4280 Hz).

Example 3-2

An air column resonance type resonator was used instead of the membrane type resonator.

An air column resonance type resonator that resonates at frequencies near 4 kHz was designed using COMSOL. The air column resonance type resonator is structured in an L shape having a hollow portion having a width of 20 mm, a length $L_e$ of 21 mm, and a thickness of $L_f$ of 3 mm, and an opening having a length $L_g$ of 5 mm and a width of 20 mm, and resonates at frequencies near 4 kHz.

Acrylic plates were combined so as to have the shape designed as described above to manufacture an air column resonance type resonator.

A thickness of the acrylic plate was 3 mm regarding a surface on the opening side, 2 mm regarding a surface facing the opening, and 3 mm regarding the side surface. Each acrylic plate was processed by a laser cutter to have a corresponding shape. The acrylic plates were bonded to each other with double-sided tape.

The manufactured air column resonance type resonators were arranged in a form of 4×4 to obtain a sound reduction structure.

Example 3-3

A Helmholtz resonator was used instead of the membrane type resonator. A Helmholtz type resonator that resonates at frequencies near 4 kHz was designed using COMSOL. In this case, the opening is slit-shaped. The Helmholtz type resonator has a slit having a width of 3 mm at the center, and a hollow portion having a width of 20 mm, a length $L_e$ of 21 mm, and a thickness $L_d$ of 3 mm, and resonates at frequencies near 4 kHz.

Acrylic plates were combined so as to have the shape designed as described above to manufacture the Helmholtz type resonator.

A thickness of the acrylic plate was 3 mm regarding a surface on the opening side, 2 mm regarding a surface facing the opening, and 3 mm regarding the side surface. Each acrylic plate was processed by a laser cutter to have a corresponding shape. The acrylic plates were bonded to each other with double-sided tape.

The manufactured Helmholtz type resonators were arranged in a form of 4×4 to obtain a sound reduction structure.

The normal incidence sound absorption coefficients of the sound absorbing bodies of Example 3-2 and Example 3-3 were measured in the same manner as in Example 3-1. The results thereof are shown in FIG. 28. In addition, in the same manner as in Example 3-1, the measurement of the sound reduction volume was performed using the three microphone method. The results thereof are shown in FIG. 29.

From FIG. 28, it is found that, the air column resonance type resonator and the Helmholtz type resonator show a sound absorption coefficient of approximately 30% at frequencies near 4 kHz, whereas the membrane type resonator shows a sound absorption coefficient close to 100%.

From FIG. 29, it is found that in both Example 3-2 in which the air column resonance type resonator is disposed in the box and Example 3-3 in which the Helmholtz type resonator is disposed in the box, a large sound reduction volume is obtained at frequencies near 4 kHz. It is found that the membrane type resonator shows a greater sound reduction volume, compared to the air column resonance type resonator and the Helmholtz type resonator. It is considered that this is because the difference in sound absorption coefficient is reflected.

In addition, since the air column resonance type resonator and the Helmholtz type resonator require a plate on the front surface side, in a case where the same rear surface space thickness is obtained, the entire thickness of the resonator is greater than that of the membrane type resonator. The entire thickness of the resonator is 5 mm in Example 3-1, whereas the other two resonators have a thickness of 8 mm. Therefore, it is found that the membrane type resonator is also advantageous from a viewpoint of miniaturization.

Table 2 showed peak values (dB) of the sound reduction volume near the resonance frequency in Examples 3-1 to 3-3. In addition, the sound reduction volumes, in a case of using the air column resonance type resonator and a case of using the Helmholtz type resonator for 2 kHz which are designed in the same manner as described above were also shown.

The air column resonance type resonator for 2 kHz was designed as an L-shaped structure having a hollow portion having a width of 20 mm, a length $L_e$ of 41 mm, and a thickness $L_f$ of 3 mm, and an opening having a length $L_g$ of 5 mm and a width of 20 mm.

The Helmholtz type resonator for 2 kHz was designed to have a slit having a width of 1 mm and a hollow portion having a width of 20 mm, a length $L_e$ of 41 mm, and a thickness $L_d$ of 3 mm.

TABLE 2

|  | For 4 kHz | For 2 kHz |
| --- | --- | --- |
| Membrane type resonator | 17.4 dB | 9 dB |
| Air column resonance type resonator | 11.1 dB | 7.3 dB |
| Helmholtz type resonator | 11.1 dB | 4.6 dB |

As shown in Table 2, although the difference is small compared with the case of 4 kHz, but it is found that the sound reduction volume of the membrane type resonator is also greater than that of the other resonators at 2 kHz.

Example 4

In Example 4, a case where different types of resonators were used was examined.

The measurement of the sound reduction volume was performed in the same manner as in Example 1, except that the resonator A (for 1 kHz) and the resonator B (for 2 kHz) were arranged in contact with a surface facing the open portion 13 and to face the speaker 30 (Example 4-3).

In addition, the sound reduction volume was also measured, in a case where only the resonator A was used (Example 4-1) and in a case where only the resonator B was used (Example 4-2). The disposed position of the resonator in Example 4-1 and Example 4-2 is different from those in Example 1 and Example 2, and accordingly, the measurement results are not the same.

Figure 30:
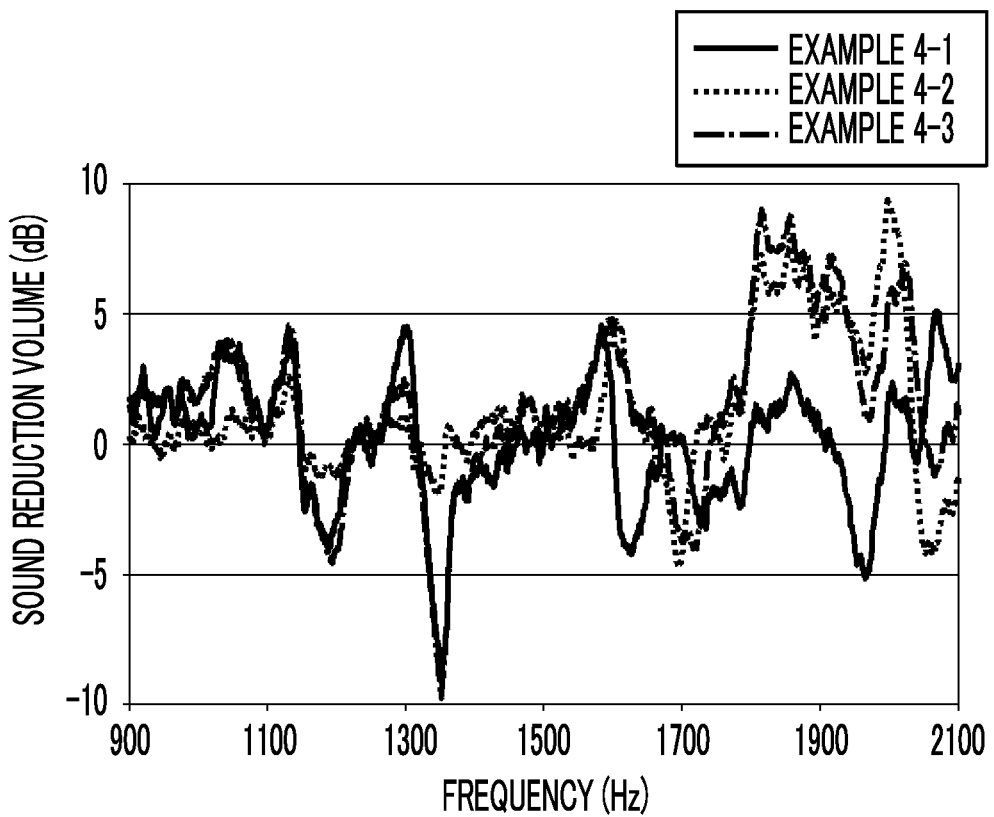
FIG. 30 is a graph showing a relationship between a frequency and a sound reduction volume.

FIG. 30 shows the measurement results.

From FIG. 30, it is found that, in a case where only one of the resonator A and the resonator B is disposed, a high sound reduction effect is only obtained at frequencies near each target frequency, but in a case where both the resonator A and the resonator B are disposed, a high sound reduction effect is obtained at frequencies near both of 1 kHz and around 2 kHz.

By disposing the resonators of different types (resonance frequencies) as described above, the sound reduction can be performed at a plurality of frequencies at the same time.

Example 5

In Example 5, the number of resonators was examined.

Four sound reduction structures used in Example 1 were manufactured. Each sound reduction structure includes 16 membrane type resonators A.

Figure 31:
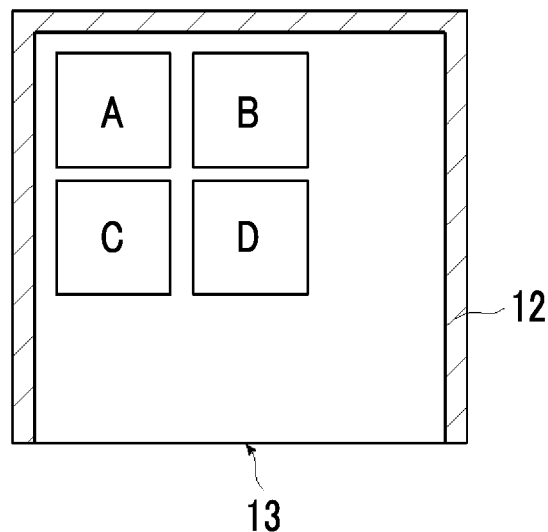
FIG. 31 is a cross-sectional view for explaining a disposed position of the sound reduction structure.

In Example (same as Example 1) in which one sound reduction structure was disposed at a position A in the box 12 shown in FIG. 31, Example 5-1 in which two sound reduction structures were disposed at the position A and a position B, Example 5-2 in which three sound reduction structures were disposed at the position A, B, and C, and Example 5-3 in which four sound reduction structures were disposed at the position A, B, C, and D, the sound reduction volume was evaluated in the same manner as in Example 1. That is, Example 1 includes 16 resonators, Example 5-1 includes 32 resonators, Example 5-2 includes 48 resonators, and Example 5-3 includes 64 resonators.

Figure 32:
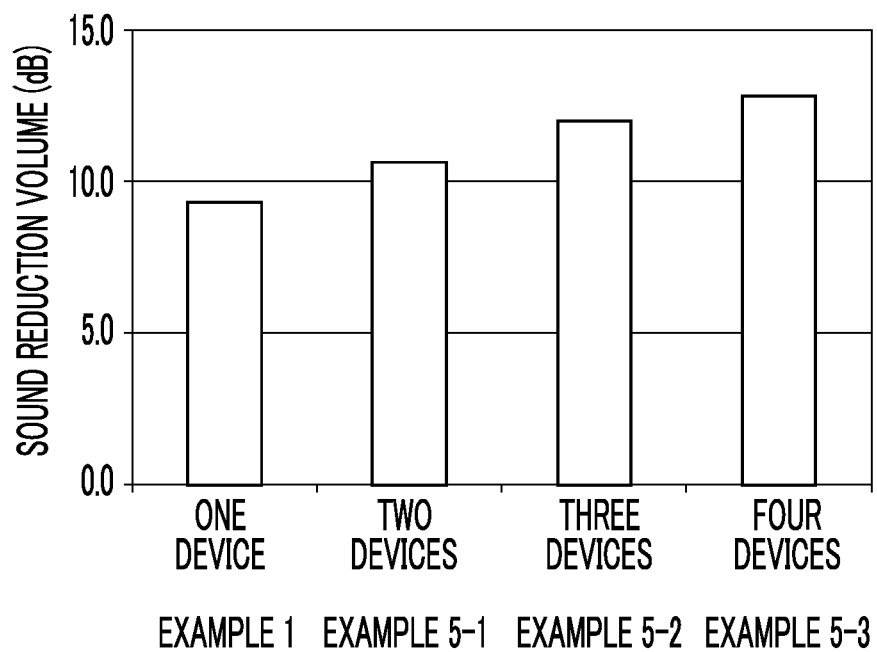
FIG. 32 is a graph comparing sound reduction volumes.

FIG. 32 shows a graph in which the peak values of the sound reduction volumes are compared.

From FIG. 32, it is found that, as the number of resonators increases, the sound reduction volume increases.

Example 6

In Example 6, the disposed positions of the resonators were examined.

Figure 33:
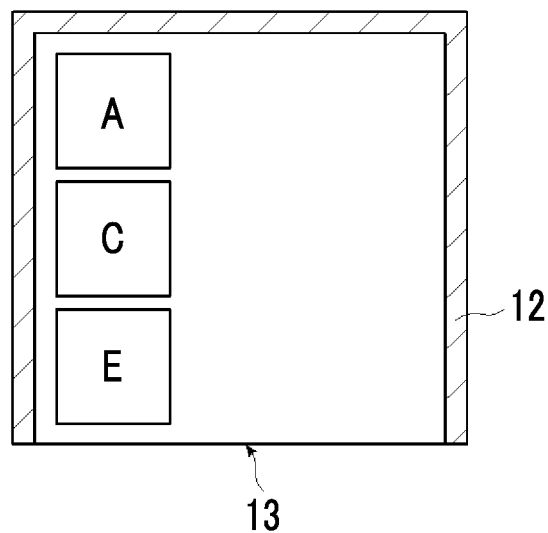
FIG. 33 is a cross-sectional view for explaining a disposed position of the sound reduction structure.

The sound reduction structure having sixteen membrane type resonators A used in Example 1 was disposed at each of the positions A (same as Example 1), C (Example 6-1), and E (Example 6-2) shown in FIG. 33, and the sound reduction volume was evaluated in the same manner as in Example 1.

Figure 34:
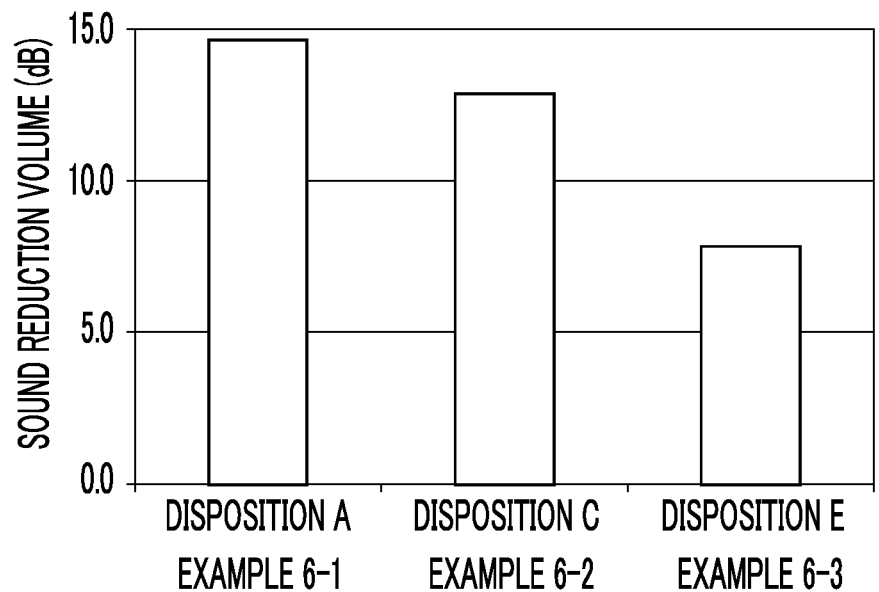
FIG. 34 is a graph comparing sound reduction volumes.

FIG. 34 shows a graph in which the peak values of the sound reduction volumes are compared.

From FIG. 34, it is found that, as the sound reduction structure is disposed at a deeper side of the box (position far from the open surface), the sound reduction volume increases.

Since the sound pressure becomes an antinode of the amplitude on the rigid body wall surface, the sound pressure amplitude tends to increase on the deep side of the box. In particular, since two surfaces of the corner of the disposition A are walls, the sound pressure tends to increase, and accordingly, the sound absorption amount of the membrane type resonator also increases. Meanwhile, since the local velocity tends to increase near the open surface such as in the disposition E, the sound pressure amount tends to comparatively decrease. Therefore, it is considered that the sound reduction volume has been reduced. As described above, there is a characteristic in the disposition dependency of the resonator in the space.

Example 7

The sound reduction volume was evaluated in the same manner as in Example 2, except that the sound reduction structure included a porous sound absorbing body.

As the porous sound absorbing body, a sound absorbing urethane having a thickness of 10 mm and a size of 130 mm×130 mm (low repulsion black urethane manufactured by Hikari Co., Ltd.) was used. The measurement was performed by disposing the resonator at the position A in FIG. 31 and the porous sound absorbing body at the position B (Example 7-1). In addition, evaluation was also performed for a case where only the resonator is provided (Example 7-2).

The evaluation was performed using the three-microphone method.

Figure 35:
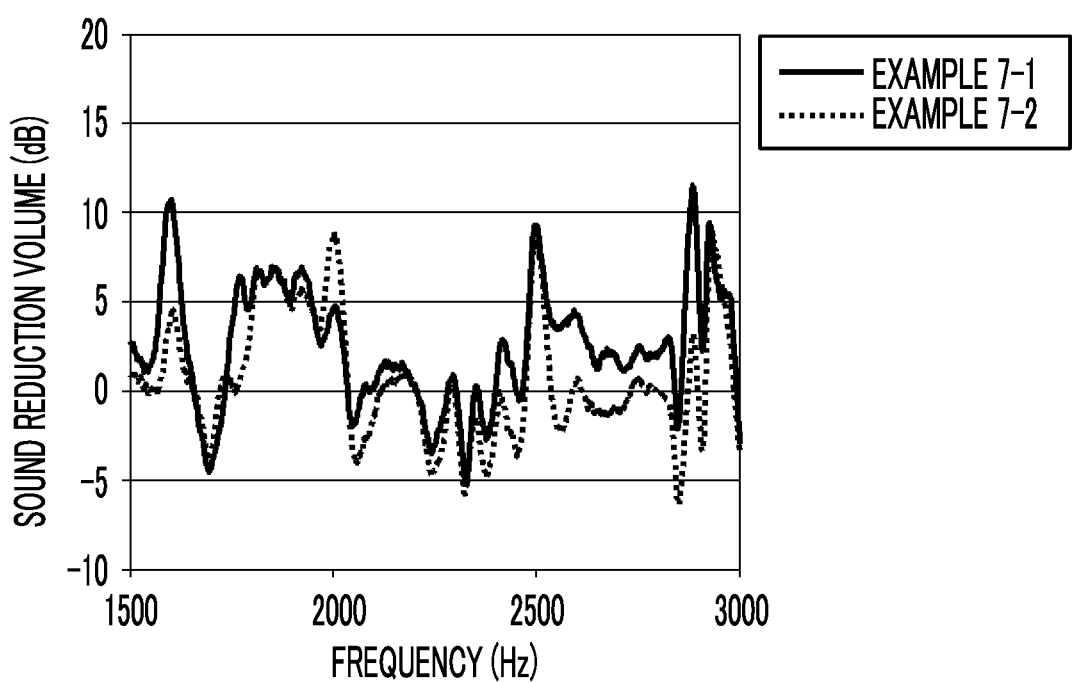
FIG. 35 is a graph showing a relationship between a frequency and a sound reduction volume.

The results thereof are shown in FIG. 35.

From FIG. 35, it is found that the sound reduction volume at 2 kHz, which is the resonance frequency, is greater in a case of only the resonator. On the other hand, it is found that the sound reduction volume at other frequencies is higher in a case where the porous sound absorbing body is placed at the same time.

Therefore, it is found that, in a case where it is desired to achieve both the sound reduction of a specific sound and the sound reduction at wide frequency band, it is preferable to use both a general porous sound absorbing body (urethane, nonwoven fabric, or felt) and the resonator.

Example 8

The same experimental system described above was obtained, except that a sound at a single frequency of 1150 Hz was generated, instead of the white noise from the speaker. As a sound pressure evaluation system, the three-microphone method was used.

First, in a state of only the box without the resonator, a speaker sound pressure was adjusted so that an average sound pressure at 1150 Hz with the three-microphone method was 80 dB.

Next, in Example 8, the sound reduction structure (configuration of including 16 resonators A) used in Example 1 was attached to the same disposed position as in Example 6-1 and the evaluation was performed. As a result of the measurement, it was found that the average sound pressure was reduced to 64 dB. In addition, before and after the installation of the sound reduction structure, it was confirmed that the radiated sound volume from the box was reduced in the sense of hearing. At this time, a volume ratio of the resonator to the entire box is only about 0.9%, but a large sound reduction effect is exhibited.

Comparative Example 2

The evaluation was performed in the same manner as in Example 8, except that a porous sound absorbing body (low-resilience black urethane manufactured by HIKARI CORPORATION) was disposed instead of the sound reduction structure.

The porous sound absorbing body had a thickness of 10 mm and a size of 130 mm×130 mm.

As a result of the measurement, it was found that the original sound pressure, which was 80 dB, was reduced to 77 dB by disposing the porous sound absorbing body.

Compared with a membrane type resonator having almost the same size, it was clear that the porous sound absorbing body used in the related art has a small effect of reducing a strong sound at a specific frequency.

Example 9

The same experimental system described above was obtained, except that a sound at a single frequency of 4280 Hz was generated, instead of the white noise from the speaker. As a sound pressure evaluation system, the three-microphone method was used.

First, in a state of only the box without the resonator, a speaker sound pressure was adjusted so that an average sound pressure at 4280 Hz with the three-microphone method was 80 dB.

Next, in Example 9, the sound reduction structure (configuration of including 16 resonators C) used in Example 3-1 was attached to the same disposed position as in Example 3-1 and the evaluation was performed. As a result of the measurement, it was found that the average sound pressure was reduced to 63 dB. Before and after the installation of the sound reduction structure, it was confirmed that the radiated sound volume from the box was reduced in the sense of hearing.

Example 10

The evaluation was performed in the same manner as in Example 9, except that the sound reduction structure (configuration of including 16 air column resonance type resonators) used in Example 3-2 was included, instead of the sound reduction structure including the resonator C. As a result of the measurement, it was found that the average sound pressure was reduced to 70 dB.

Example 11

The evaluation was performed in the same manner as in Example 9, except that the sound reduction structure (configuration of including 16 Helmholtz type resonators) used in Example 3-3 was included, instead of the sound reduction structure including the resonator C. As a result of the measurement, it was found that the average sound pressure was reduced to 71 dB.

Comparative Example 3

The evaluation was performed in the same manner as in Example 9, except that a porous sound absorbing body (low repulsion black urethane manufactured by Hikari Co., Ltd) was disposed instead of the sound reduction structure.

The porous sound absorbing body had a thickness of 10 mm and a size of 130 mm×130 mm.

As a result of the measurement, it was found that the original sound pressure, which was 80 dB, was reduced to 75 dB by disposing the porous sound absorbing body.

Regarding the sizes, the plane size is the same as that of the resonator structure, and the thickness of the porous sound absorbing body is greater than that. Compared with each resonator, it was clear that the porous sound absorbing body used in the related art has a small effect of reducing a strong sound at a specific frequency.

From the comparison between Examples 8 to 11 and Comparative Examples 2 and 3, it is found that even in a case where a sound at a specific frequency is emitted from a sound source in the box, the sound can be efficiently reduced by the resonator.

Reference Example 1

An acrylic cubic box having an internal space of 500 mm on a side was prepared. An acryl thickness was 10 mm, and accordingly, a sound was sufficiently reflected. A cube having only one side open was used as a box. The box was set so that the open surface was perpendicular to the ground.

A speaker (Speaker "P650-E" manufactured by Fostex) was disposed as a sound source in the center of the rear side in the box so that the front part (front of the speaker vibration surface) faced one side of the box.

Three microphones (½ inch microphone 4125N manufactured by Accor Corporation) were disposed at positions separated from the open surface by 150 mm vertically as measuring instruments. Each microphone was disposed at positions of 100 mm, 250 mm, and 400 mm from one end face in a direction parallel to the open face. The height of the microphone from the ground was 100 mm.

An average value of sound energies (sound pressures) for each frequency measured by each of these three microphones was obtained, and the sound radiated from the box was evaluated.

First, in a state where the sound reduction structure was not disposed in the box, the speaker is operated to generate white noise and sound pressure of the sound radiated from the box was measured. This was set as Reference Example 1, and the amount of reduction in sound pressure from Reference Example 1 was evaluated as a prevented amount of a radiated sound.

Example 12

A sound reduction structure including 4×4 resonators F which are the same membrane type resonator as the resonator C, except that the inner thickness (the thickness of the rear surface space) was set as 2 mm, as the resonator.

Figure 37:
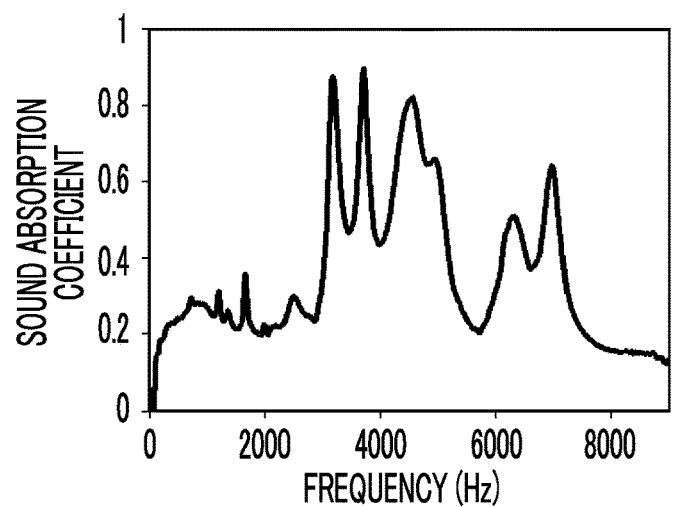
FIG. 37 is a graph showing a relationship between a frequency and a sound absorption coefficient.

The normal incidence sound absorption coefficient of the resonator F (sound reduction structure) was measured using an acoustic tube. In this examination, a normal incidence sound absorption coefficient was measured by a two-microphone method using an acoustic tube having a diameter of 20 mm. A soundproof structure was placed at the end of the acoustic tube, the membrane-like member side was disposed as the sound incident surface side, and the normal incidence sound absorption coefficient was evaluated. The results thereof are shown in FIG. 37.

It is found that a maximum sound absorption coefficient is obtained around 4 kHz, which is the high-order vibration frequency, and the sound is absorbed over a wide band by a plurality of high-order vibration modes. In addition, it is found that there is a sound absorption peak due to the fundamental vibration near 1.6 kHz on the low frequency side. That is, the resonator F has a configuration in which a thickness of the rear surface space is decreased so that the sound absorption of high-order vibration is greater than that of the fundamental vibration.

The resonator F (sound reduction structure) was disposed at a position in front of the speaker in the box (the corner of the resonator F was aligned with the corner on the inner lower side of the box).

In this state, white noise was generated from the speaker, and the amount of reduction of the sound pressure (prevented amount of a radiated sound) from Reference Example 1 in which the sound pressure of the sound radiated from the box is not performed, was obtained.

Figure 38:
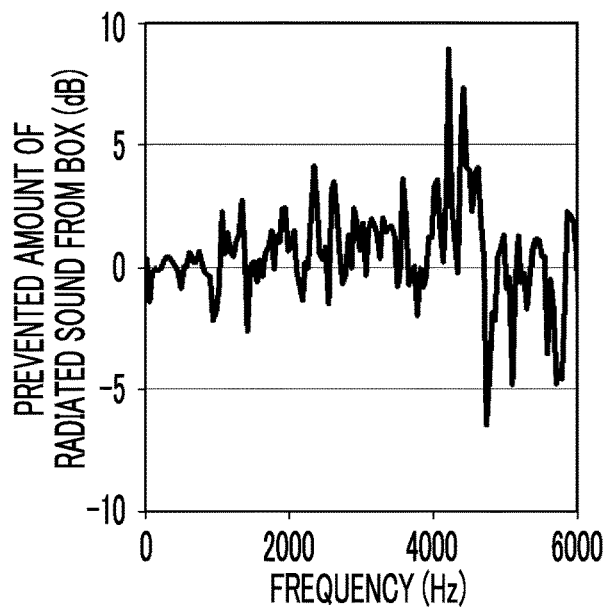
FIG. 38 is a graph showing a relationship between a frequency and a prevented amount of a radiated sound from the box.

The results thereof are shown in FIG. 38.

From FIG. 38, it is found that a strong sound reduction effect is obtained near 4 kHz to correspond to the resonance peak of the high-order vibration of the resonator F. As described above, even in a case where a comparatively large box having an inner size of 500 mm is used, the sound reduction effect of the resonator can be exhibited.

Example 13

Next, the prevented amount of a radiated sound was obtained in the same manner as in Example 12, except that the resonator F (sound reduction structure) was disposed on the rear surface side (opposite to the front side) of the speaker in the box.

Figure 39:
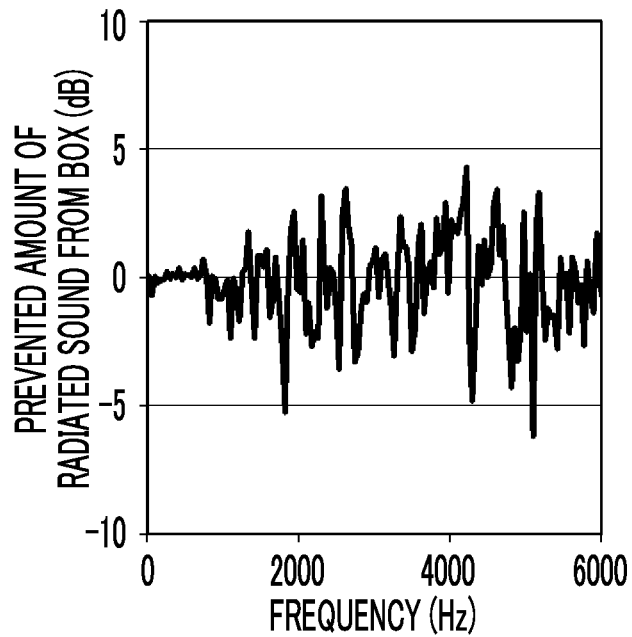
FIG. 39 is a graph showing a relationship between a frequency and a prevented amount of a radiated sound from the box.

The results thereof are shown in FIG. 39.

From FIGS. 38 and 39, it is found that, although the same resonator F is used in Examples 12 and 13, the prevented amount of a radiated sound at the resonance frequency is smaller in Example 13 than that in Example 12. That is, it is found that the sound reduction effect changes depending on the position of the resonator F (sound reduction structure) with respect to the speaker.

Here, in the systems used in Examples 12 and 13, the distribution of the sound pressure around the speaker (hereinafter, also referred to as a sound source radiation distribution) was measured using a sound level meter "FFT analyzer/handheld analyzer TYPE6240" manufactured by ACO Co., Ltd. The measurement was performed at a distance of 50 mm from the speaker.

First, white noise was generated from the speaker. A maximum value of the sound pressure was 66 dB at the front portion of the speaker (front of the speaker vibration surface). In addition, a minimum value of the sound pressure was 50 dB on the rear side of the speaker. As described above, it was found that, in a case where the white noise is generated from the speaker,
a sound pressure difference of 16 dB is generated in the sound pressure distribution around the speaker.

Next, a sound at a single frequency of 4.2 kHz was emitted from the speaker, and the sound source radiation distribution around the speaker was determined in the same manner as described above. A maximum value of the sound pressure was 64 dB at the front portion of the speaker. In addition, a minimum value of the sound pressure was 51 dB on the rear side. As described above, it is found that there is a large deviation in the sound source radiation distribution, whether it is white noise or single frequency sound.

In addition, from the results of Example 12 and Example 13, it is found that a higher sound reduction effect is obtained by disposing the resonator in a direction of the maximum sound volume in the sound source radiation distribution.

In a graphs in FIGS. 38 and 39 and FIG. 40 which will be described later showing a relationship between the frequency and the prevented amount of a radiated sound from the box, the noise component is great, but this is due to the following reason.

The higher the frequency, the closer the node and the antinode of the sound wave, and the positions of the node and the antinode change with a slight change in the radiation distribution. The sound pressure mode in the box changes slightly in a case where the resonator is inserted into the box, and accordingly, the sound pressure distribution radiated from the open portion also changes slightly. The change is small on the low frequency side, but on the high frequency side, the slight change tends to lead to a change in the magnitude of the sound pressure at the position of the microphone. Therefore, on the high frequency side, the prevented amount of a radiated sound from the box forms a waveform alternating between plus and minus. The total amount of sound radiated from the box does not change as much as the fluctuation of the measurement data, and accordingly, this effect can be reduced by obtaining an average by increasing the number of microphones.

Meanwhile, in a case where the radiated sound volume is actually decreased due to the effect of the resonator, the prevented amount of a radiated sound with a certain frequency width a frequency near 4 kHz of FIG. 38 forms a waveform deviated to the plus side, and thus, it can be recognized.

Example 14

A sound reduction structure including various resonators having different sizes of the open portion of the frame was manufactured.

One direction in the plane of the sound reduction structure was set as an X axis and a direction perpendicular thereto was set as a Y axis, a frame was prepared in which the open portion sizes was changed from 10 mm to 30 mm at every 2 mm in each axial direction. That is, squares having a size of 10 mm×10 mm to 30 mm×30 mm are arranged on the diagonal line of the sound reduction structure, and the other cells are rectangles having different lengths in the X-axis direction and the Y-axis direction.

A membrane-like member (PET film, thickness of 50 μm) was attached to all open surfaces of the frame to manufacture a sound reduction structure. This sound reduction structure has a configuration including a plurality of resonators having different resonance frequencies.

This sound reduction structure was disposed at a position in front of the speaker in the box, and the prevented amount of a radiated sound was measured in the same manner as in Example 1.

Figure 40:
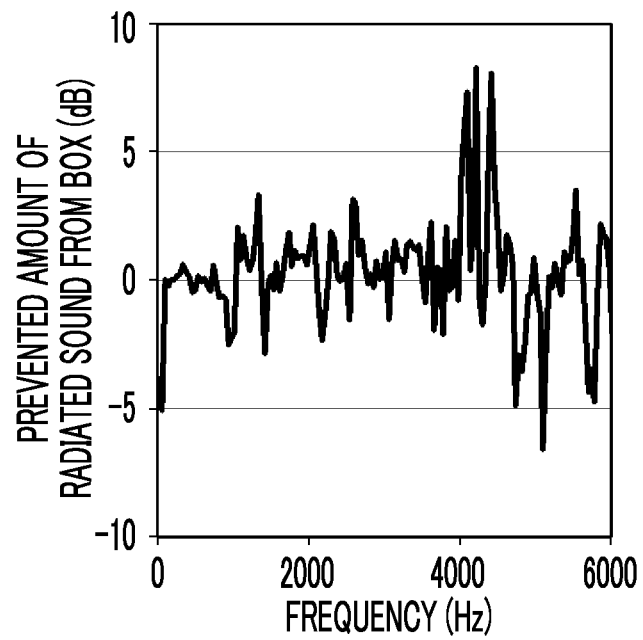
FIG. 40 is a graph showing a relationship between a frequency and a prevented amount of a radiated sound from the box.

The results thereof are shown in FIG. 40.

The sound reduction structure of Example 14 includes a plurality of resonators having different resonance frequencies, but an average value of the resonance frequencies is near 4 kHz as in a case of the resonator having the open portion size of 20 mm×20 mm.

From FIG. 40, it is found that a high sound reduction effect is exhibited near 4 kHz which is an average value of the resonance frequencies. In addition, it is found that there are three peaks exceeding 5 dB as compared with Example 12, and the band is slightly broadened to the lower frequency side.

Example 15

A sound reduction structure including 4×4 resonators G in the same manner as the resonator F in Example 12 was manufactured, except that an aluminum foil (manufactured by Mitsubishi Aluminum) having a thickness of 12 μm was used as the membrane-like member instead of the PET film, and the thickness of the inner portion (thickness of rear surface space) was set as 5 mm.

This resonator G (sound reduction structure) was disposed at a position in front of the speaker in the box, and the prevented amount of a radiated sound was measured in the same manner as in Example 12.

Figure 41:
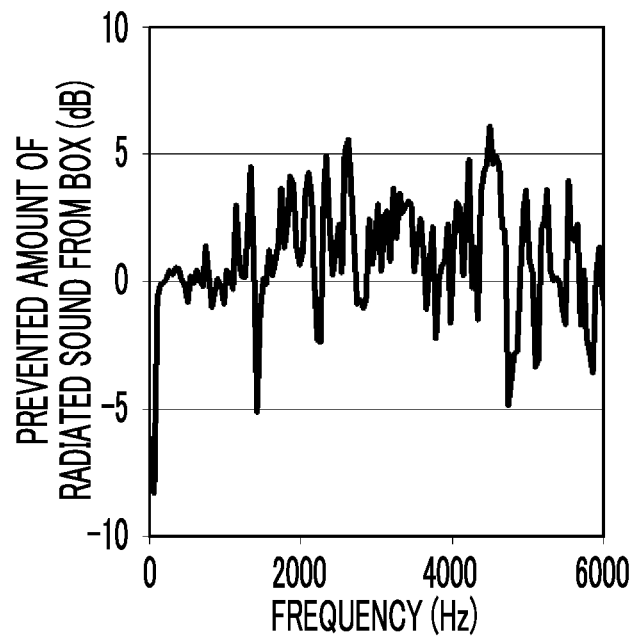
FIG. 41 is a graph showing a relationship between a frequency and a prevented amount of a radiated sound from the box.

The results thereof are shown in FIG. 41.

From FIG. 41, it is found that a sound reduction effect is obtained at a comparatively low frequency of 2 to 3 kHz, and a sound reduction effect exceeding 5 dB is also obtained near 4 kHz. As described above, it is found that the sound reduction effect can be obtained even in a case where not only the polymer film but also other materials such as metal are used as the membrane-like member.

The normal incidence sound absorption coefficient of the resonator G of Example 15 was measured in the same manner as in Example 12.

Figure 42:
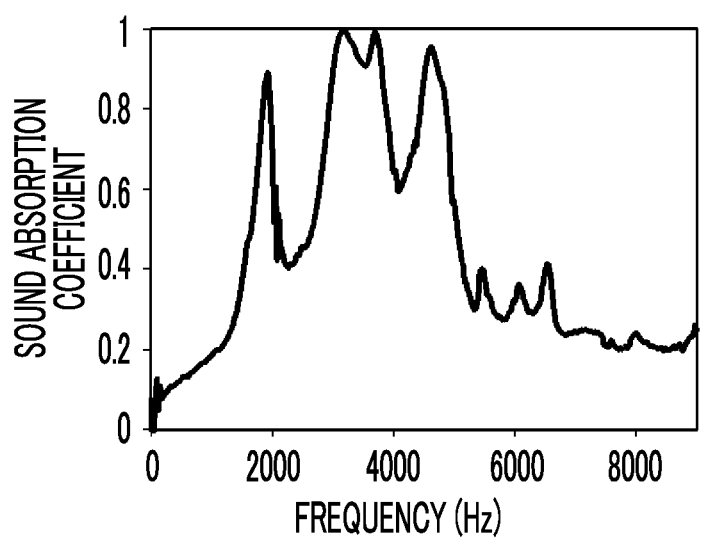
FIG. 42 is a graph showing a relationship between a frequency and a sound absorption coefficient.

The results thereof are shown in FIG. 42.

From FIG. 42, the maximum sound absorption coefficient is near 4 kHz which is the high-order vibration frequency, and a sound absorption peak is also obtained near 2 kHz on the lower frequency side. That is, the resonator G has a configuration in which the high-order vibration sound absorption is increased by decreasing the thickness of the rear surface space. In a case where FIG. 42 and FIG. 41 are compared, it is found that the prevented amount of a radiated sound from the box is increased corresponding to the frequency at which the sound absorption coefficient is high, and the sound reduction effect is exhibited.

Example 16

A sound reduction structure including 4×4 resonators H in the same manner as the resonator G of Example 15, except that the size of the open portion of the frame was 35 mm×35 mm was manufactured, and the prevented amount of a radiated sound was measured.

Figure 43:
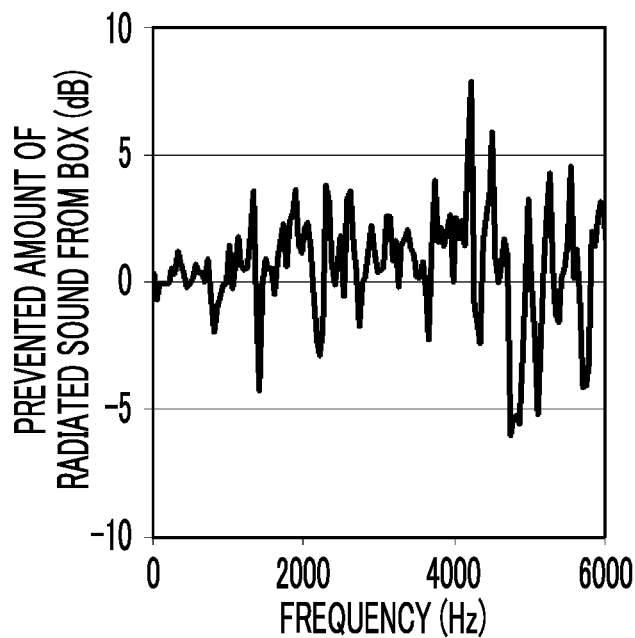
FIG. 43 is a graph showing a relationship between a frequency and a prevented amount of a radiated sound from the box.

The results thereof are shown in FIG. 43.

From FIG. 43, it is found that, even in a case where a metal foil is used as the membrane-like member, the sound reduction effect is obtained at different frequencies by changing the size of the open portion of the frame.

Example 17

A Helmholtz resonator was used instead of the membrane type resonator.

The Helmholtz type resonator has a hollow portion of 20 mm×20 mm×2 mm and an opening having a diameter of 6 mm.

The sound reduction structure was configured by arranging a plurality of Helmholtz type resonators in the plane direction, and the size of the entire sound reduction structure was 300 mm×300 mm square.

Acrylic plates having a thickness of 2 mm were combined to have the above-mentioned shape, thereby manufacturing a sound reduction structure having a Helmholtz type resonator. Each acrylic plate was processed by a laser cutter to have a corresponding shape. The acrylic plates were bonded to each other with double-sided tape.

The normal incidence sound absorption coefficient of this sound reduction structure was measured in the same manner as in Example 12.

Figure 44:
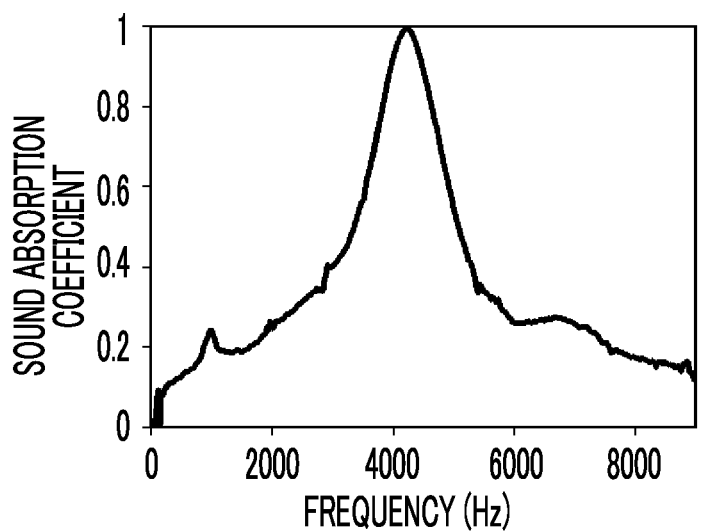
FIG. 44 is a graph showing a relationship between a frequency and a sound absorption coefficient.

The results thereof are shown in FIG. 44.

This sound reduction structure was disposed at the position in front of the speaker in the box, and the prevented amount of a radiated sound was measured in the same manner as in Example 12.

Figure 45:
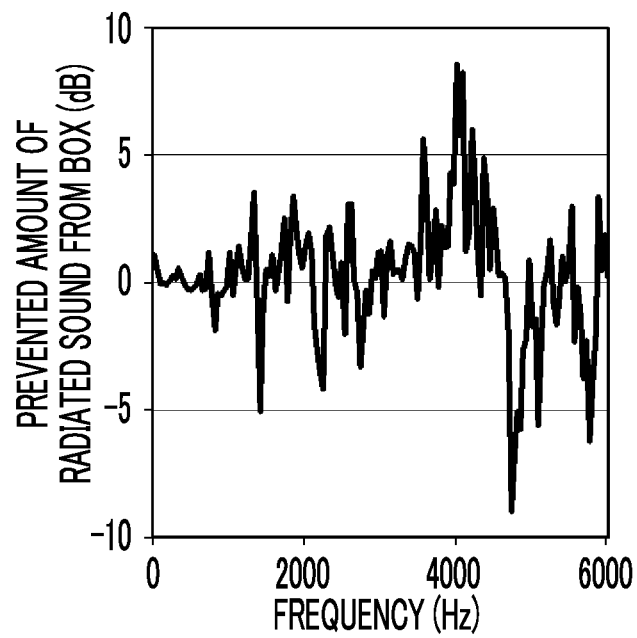
FIG. 45 is a graph showing a relationship between a frequency and a prevented amount of a radiated sound from the box.

The results thereof are shown in FIG. 45.

From FIG. 45, it is found that even in a case where the Helmholtz-type resonator is used, a high sound reduction effect is obtained near 4 kHz which is the resonance frequency. From the comparison between FIG. 44 and FIG. 45, it is found that, in accordance with the frequency at which the sound absorption coefficient of the Helmholtz type resonator is high, the prevented amount of a radiated sound from the box increases, and a selective peak of sound reduction appears.

Example 18

Next, the prevented amount of a radiated sound was obtained in the same manner as in Example 17, except that the sound reduction structure was disposed on the rear surface side of the speaker in the box.

Figure 46:
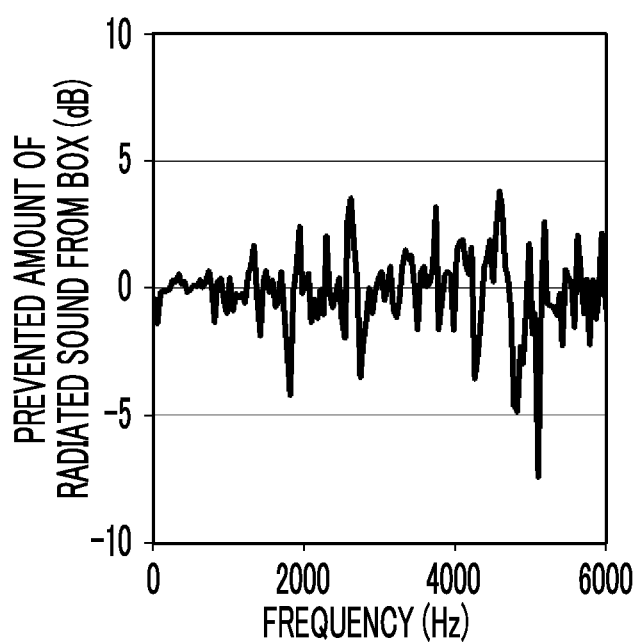
FIG. 46 is a graph showing a relationship between a frequency and a prevented amount of a radiated sound from the box.

The results thereof are shown in FIG. 46.

From FIGS. 45 and 46, it is found that, despite the use of the same sound reduction structure in Examples 17 and 18, the prevented amount of a radiated sound at the resonance frequency is smaller in Example 18 compared to Example 17. That is, it is found that the sound reduction effect changes depending on the disposed position of the sound reduction structure with respect to the speaker.

Example 19

The configuration in which two resonators were laminated was examined.

A structure in which a membrane-like member (PET film) having a thickness of 50 μm, a frame having an open portion size of 20 mm×20 mm and a thickness of 2 mm, a plate-shaped member (acrylic plate) including a through hole having a diameter of 6 mm and having a thickness of 2 mm, a frame having an open portion size of 20 mm×20 mm and a thickness of 2 mm, and an acrylic plate having a thickness of 2 mm were laminated in this order, was manufactured. That is, a structure in that a membrane type resonator on a side where sound is incident and a Helmholtz-type resonator on the rear surface side thereof are laminated was obtained.

The sound reduction structure was configured by arranging a plurality of such structures in the plane direction, and the size of the entire sound reduction structure was 300 mm×300 mm square.

This sound reduction structure was disposed at the position in front of the speaker in the box, and the prevented amount of a radiated sound was measured in the same manner as in Example 12.

Figure 47:
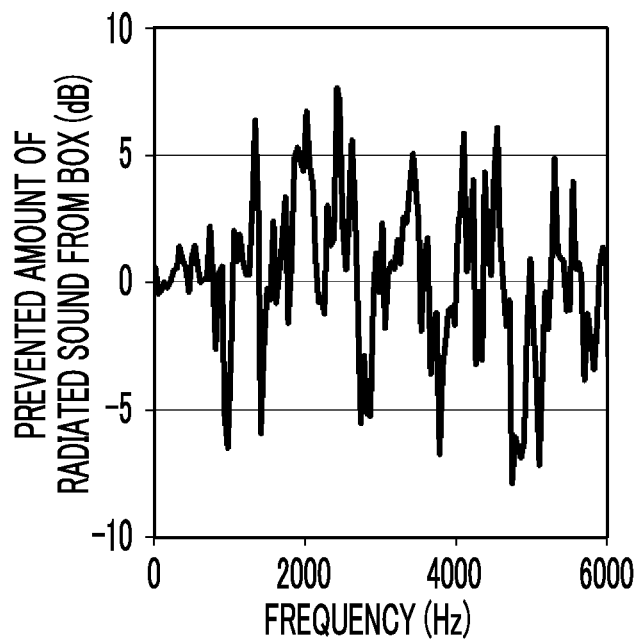
FIG. 47 is a graph showing a relationship between a frequency and a prevented amount of a radiated sound from the box.

The results thereof are shown in FIG. 47.

From FIG. 47, it is found that the prevented amount of a radiated sound increases not only near 4 kHz, but also near 2 kHz on the lower frequency side and near 6 kHz on the higher frequency side. This is an effect due to the structure in which the resonators are laminated.

Example 20

Next, the prevented amount of a radiated sound was obtained in the same manner as in Example 19, except that the sound reduction structure was disposed on the rear surface side of the speaker in the box.

Figure 48:
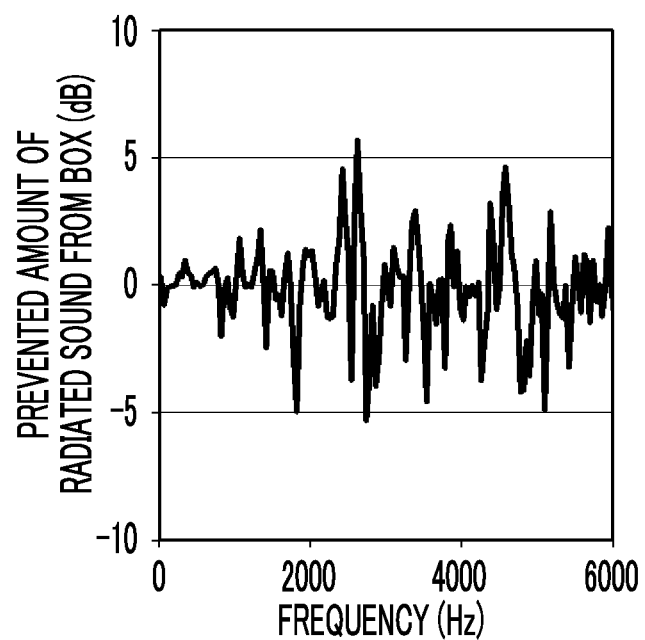
FIG. 48 is a graph showing a relationship between a frequency and a prevented amount of a radiated sound from the box.

The results thereof are shown in FIG. 48.

From FIGS. 47 and 48, it is found that, although the same sound reduction structure is used in Examples 19 and 20, the prevented amount of a radiated sound at the resonance frequency is smaller in Example 20 than that in Example 19. That is, it is found that the sound reduction effect changes depending on the disposed position of the sound reduction structure with respect to the speaker.

Example 21

A sound reduction structure was manufactured in the same manner as in Example 19, except that the positions of the membrane-like member and the plate-like member having the through hole were interchanged. That is, a structure in which a Helmholtz-type resonator on the side where sound is incident and a membrane type resonator on the rear surface side of the resonator are laminated was obtained.

This sound reduction structure was disposed at the position in front of the speaker in the box, and the prevented amount of a radiated sound was measured in the same manner as in Example 12.

Figure 49:
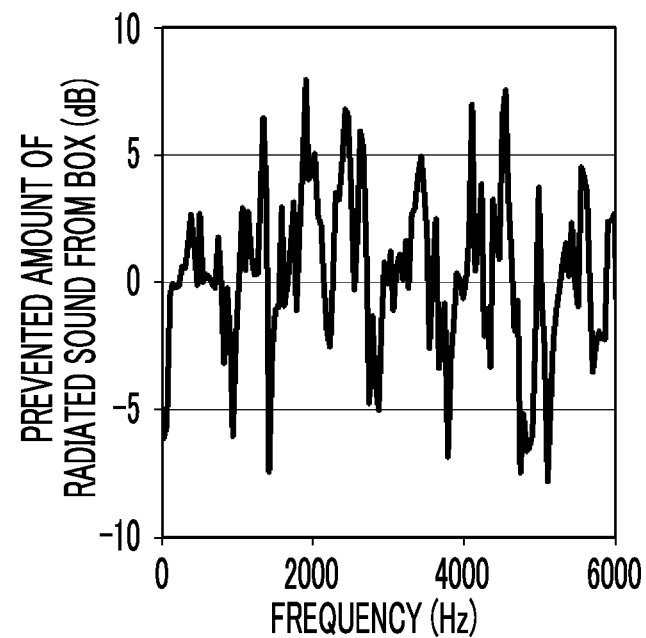
FIG. 49 is a graph showing a relationship between a frequency and a prevented amount of a radiated sound from the box.

The results thereof are shown in FIG. 49.

From FIG. 49, it is found that the sound reduction effect is obtained in a wide band as in a case of Example 19.

Reference Example 2

Next, a configuration in which a porous sound absorbing body was laminated on the resonator was examined.

First, as Reference Example 2, the prevented amount of a radiated sound of the porous sound absorbing body alone was measured. As the porous sound absorbing body, a low-repulsion urethane KTHU having a thickness of 10 mm and a size of 300 mm×300 mm was used.

The prevented amount of a radiated sound was measured in the same manner as in Example 12 by disposing the porous sound absorbing body in front of the speaker in the box.

Figure 50:
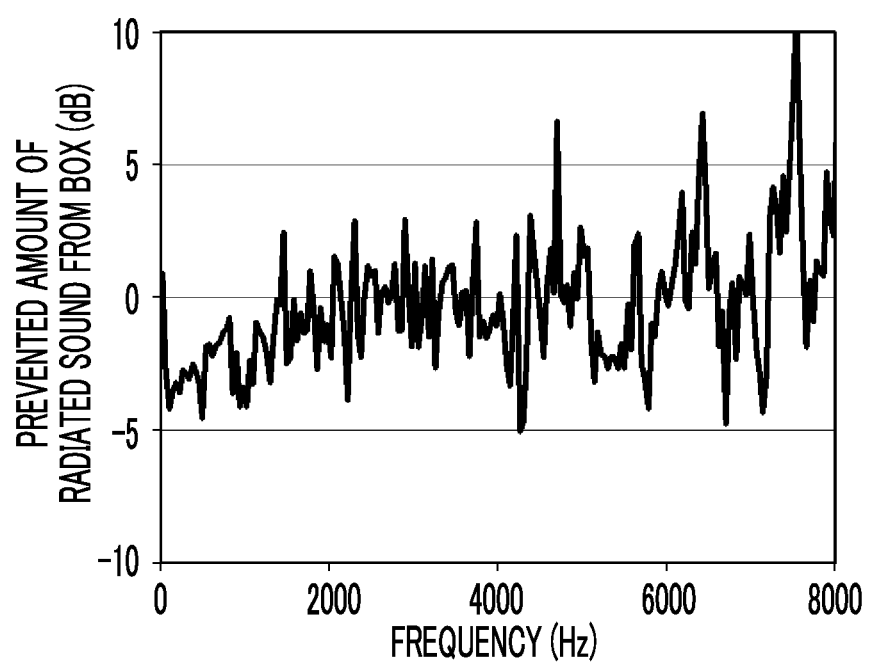
FIG. 50 is a graph showing a relationship between a frequency and a prevented amount of a radiated sound from the box.

The results thereof are shown in FIG. 50.

From FIG. 50, the sound reduction effect on the high frequency side is exhibited due to the effect of the low-repulsion urethane, which is a porous sound absorbing body, but substantially no sound reduction effect is obtained on the low frequency side of 4 kHz or lower. It is considered that the reason thereof is that the thickness of the low-repulsion urethane is 10 mm, and accordingly, the sound absorbing effect is not obtained on the low frequency side where the thickness is sufficiently smaller than the wavelength size.

Example 22

The prevented amount of a radiated sound was measured in the same manner as in Example 12, except that the porous sound absorbing body used in Reference Example 2 was laminated on a membrane-like member having a sound reduction structure. Only the outer peripheral part of the porous sound absorbing body and the sound reduction structure was fixed with double-sided tape.

Figure 51:
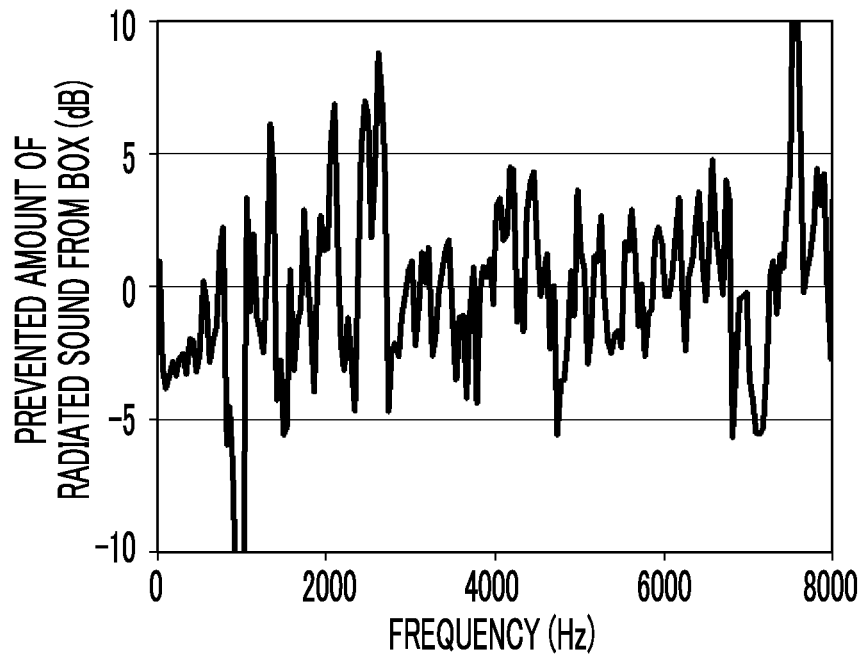
FIG. 51 is a graph showing a relationship between a frequency and a prevented amount of a radiated sound from the box.

The results thereof are shown in FIG. 51.

From FIG. 51, it is found that the peak of the prevented amount of a radiated sound by the porous sound absorbing body is observed on the high frequency side near 7 kHz, and the prevented amount of a radiated sound increases over a wide band on the low frequency side at 4 kHz or lower. Since a porous sound absorbing body such as urethane is ventilated, sound reaches even the membrane type resonator on the lower portion, through the urethane on the low frequency side where the sound absorbing effect of urethane is insufficient. Accordingly, on the low frequency side, the sound reduction effect caused by the resonance structure of the resonator is obtained. Meanwhile, since the surface is formed of urethane on the high frequency side, the sound absorbing effect of the urethane is obtained. By doing so, it is found that a high sound reduction effect over a wide band is obtained by laminating the resonator and the porous sound absorbing body.

Example 23

The prevented amount of a radiated sound was measured in the same manner as in Example 15, except that the porous sound absorbing body used in Reference Example 2 was laminated on a membrane-like member (aluminum foil) having a sound reduction structure. Only the outer peripheral part of the porous sound absorbing body and the sound reduction structure was fixed with double-sided tape.

Figure 52:
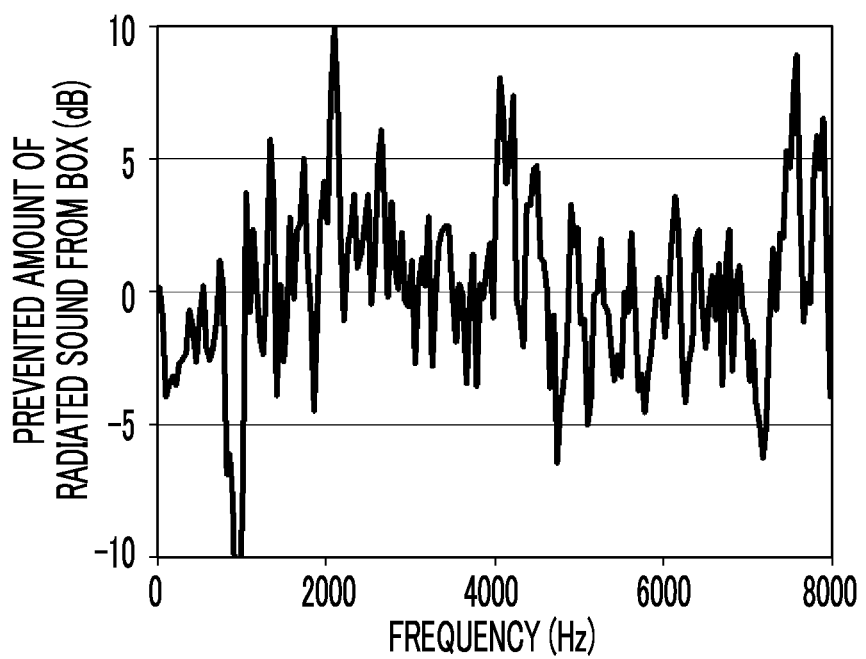
FIG. 52 is a graph showing a relationship between a frequency and a prevented amount of a radiated sound from the box.

The results thereof are shown in FIG. 52.

From FIG. 52, it is found that, in the same manner as in Example 22, both the sound reduction effect caused by the porous sound absorbing body on the high frequency side and the sound reduction effect caused by the resonator on the low frequency side are obtained.

Example 24

The prevented amount of a radiated sound was measured in the same manner as in Example 17, except that the porous sound absorbing body used in Reference Example 2 was laminated on the Helmholtz type resonator having a sound reduction structure (on the surface on the opening side). Only the outer peripheral part of the porous sound absorbing body and the sound reduction structure was fixed with double-sided tape.

Figure 53:
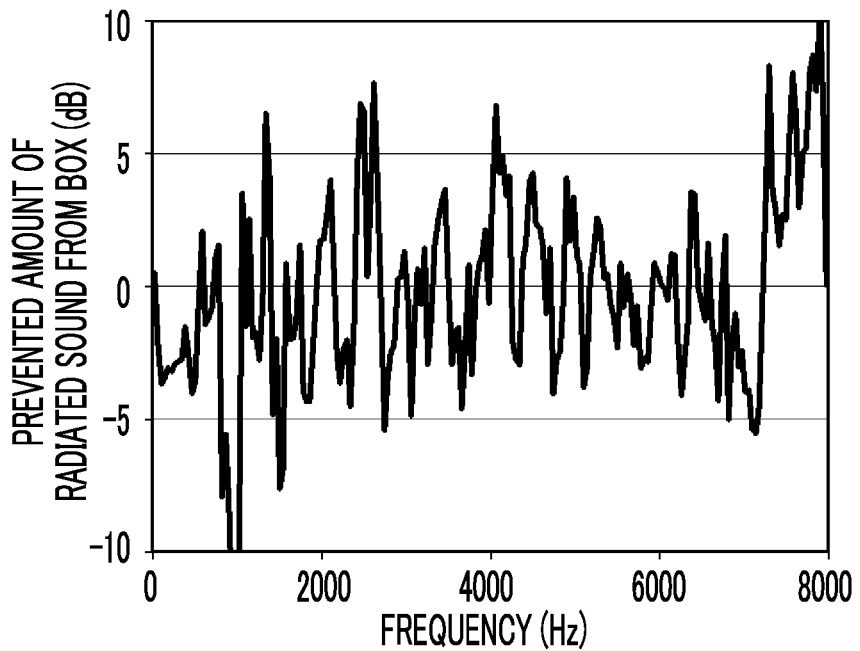
FIG. 53 is a graph showing a relationship between a frequency and a prevented amount of a radiated sound from the box.

The results thereof are shown in FIG. 53.

FIG. 53 shows that, it is found that, in the same manner as in Example 22, both the sound reduction effect caused by the porous sound absorbing body on the high frequency side and the sound reduction effect caused by the resonator on the low frequency side can be obtained.

Example 25

The prevented amount of a radiated sound was measured in the same manner as in Example 15, except that a mesh member (air-permeable member) was bonded to the entire surface of the membrane-like member (aluminum foil) having the sound reduction structure. As the mesh member, a glass fiber pressure sensitive adhesive tape (mesh size: 2.8 mm×2.8 mm) was used. By attaching the mesh member, the membrane-like member is reinforced and hardly broken.

Figure 54:
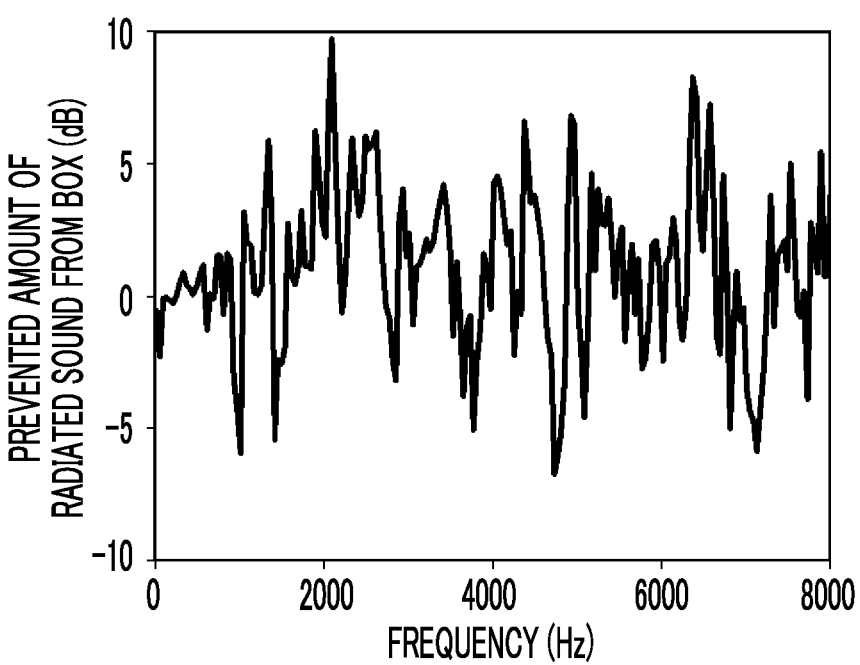
FIG. 54 is a graph showing a relationship between a frequency and a prevented amount of a radiated sound from the box.

The results thereof are shown in FIG. 54.

From FIG. 54, it is found that the sound reduction effect is obtained even in a case where the mesh member is attached.

Reference Example 3

Next, a case where an air-permeable member was disposed in the opening of the box was examined.

First, as Reference Example 3, the prevented amount of a radiated sound was measured in a state where an air-permeable member was attached to the entire surface of the opening of the box, without disposing the sound reduction structure inside the box.

As the air-permeable member, a sound absorbing felt board "Fermenon" (manufactured by Drix Corporation) having a thickness of 9 mm was used.

Figure 55:
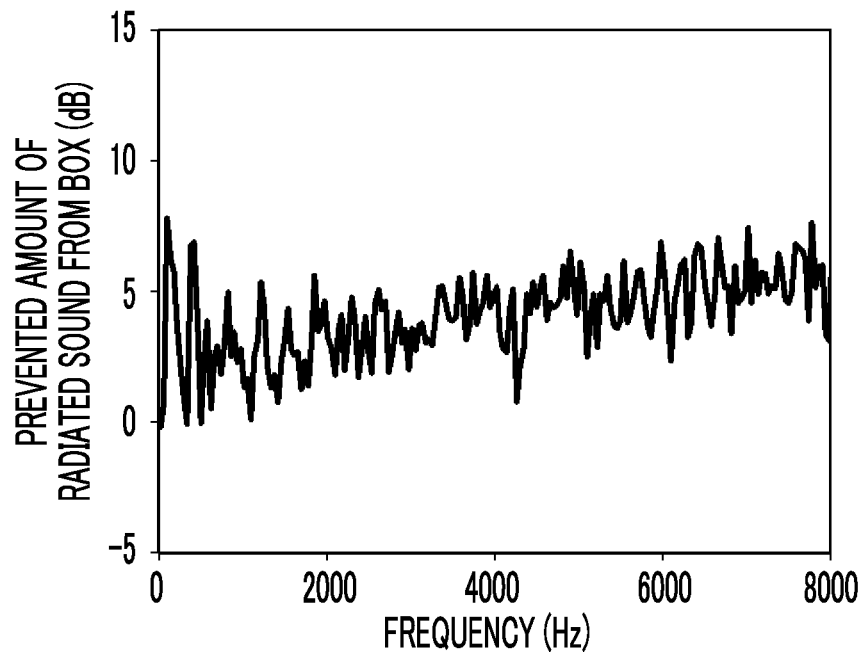
FIG. 55 is a graph showing a relationship between a frequency and a prevented amount of a radiated sound from the box.

The results thereof are shown in FIG. 55.

From FIG. 55, it is found that, since the air-permeable member used has the properties of a normal porous sound absorbing material, the prevented amount of a radiated sound increases on the high frequency side.

Example 26

The prevented amount of a radiated sound was measured in the same manner as in Example 12, except that the air-permeable member used in Reference Example 3 was attached to the opening of the box.

Figure 56:
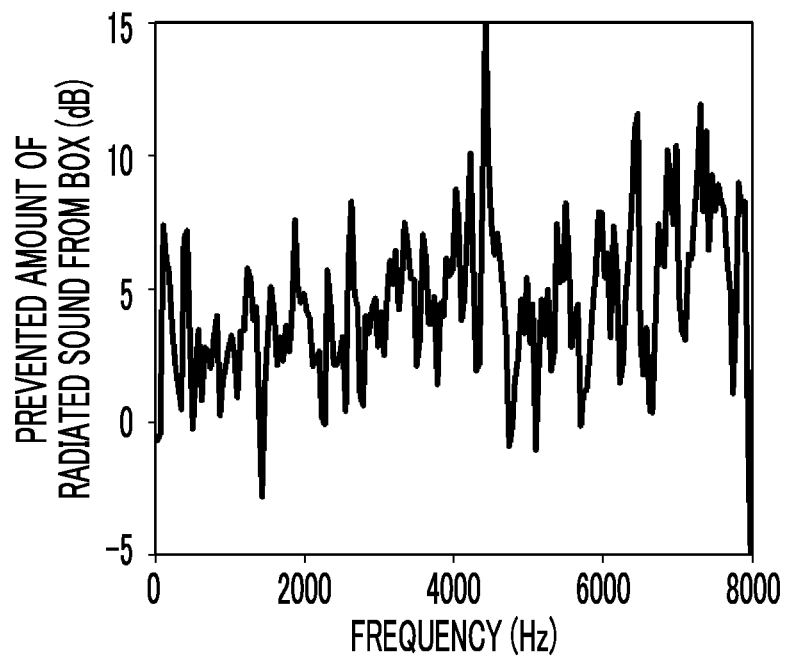
FIG. 56 is a graph showing a relationship between a frequency and a prevented amount of a radiated sound from the box.

The results thereof are shown in FIG. 56.

From FIG. 56, it is found that, even in a case where the air-permeable member is attached to the opening, a high sound reduction effect caused by the resonance of the resonator can be obtained. In addition, in comparison with Example 12, it is found that, in addition to the sound reduction effect due to resonance, a wide-band sound reduction effect on the high frequency side is obtained by the air-permeable member disposed in the opening.

Example 27

The prevented amount of a radiated sound was measured in the same manner as in Example 17 (Helmholtz-type resonator), except that the air-permeable member used in Reference Example 3 was attached to the opening of the box.

Figure 57:
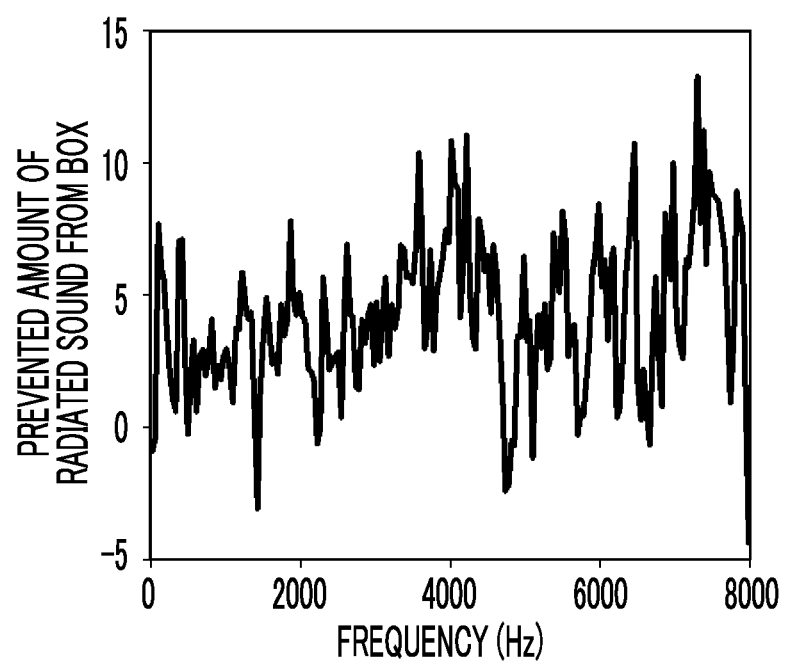
FIG. 57 is a graph showing a relationship between a frequency and a prevented amount of a radiated sound from the box.

The results thereof are shown in FIG. 57.

From FIG. 57, it is found that both a high sound reduction effect near 4 kHz due to the resonance of the resonator and a sound reduction effect at high frequencies by the air-permeable member can be obtained.

As described above, even in a case where the air-permeable member is attached to the opening of the box, the sound reduction effect of the internal resonator can be obtained, and in a case where the air-permeable member has sound absorbing performance, both the sound reduction effects can be satisfied.

Example 28

As shown in FIG. 36, a box-shaped soundproof structure in which a sound reduction structure is disposed in a box having a structure in which three surfaces including two facing surfaces and one surface between the two surfaces are opened is manufactured as follows.

Two acrylic plates having a thickness of 5 mm and a size of 160 mm×50 mm were cut out with a laser cutter. The two acrylic plates are used as a base to form a box having a height of 50 mm. The ceiling portion of the box had a square sound reduction structure having 7×7 resonators F of Example 12. That is, a part of the box serves as a frame of the resonance structure. A box-shaped soundproof structure having a π-shaped box was formed by fixing two acrylic plates serving as the base and the sound reduction structure serving as a ceiling with screws.

This box-shaped soundproof structure was disposed so as to cover the small speaker "SMART BOX".

A sound at a single frequency of 4.2 kHz was generated from the speaker, and the sound pressure was measured with a microphone at a position separated from the speaker by 1 m.

As a result, it was found that, in a case where the speaker is covered with the box-shaped soundproof structure, the sound reduction effect of 20 dB was obtained, compared to a case where nothing was placed.

In addition, for a comparison, a n-type box formed of only an acrylic plate having no membrane type resonance structure was manufactured, the speaker was covered with this, and the sound pressure was measured. The sound reduction effect was 2 dB and was substantially not exhibited.

In addition, in a case where the hearing is actually confirmed at the position where the microphones are disposed, it was confirmed that the sound at a single frequency is obviously reduced by covering the box-shaped soundproof structure.

From the above, it is clear that the effect of the invention is obtained.

EXPLANATION OF REFERENCES

10: box-shaped soundproof structure
12: box
13: open portion
14: sound reduction structure
15: opening
16: membrane-like member
17: container
18: frame
19: resonance tube
20: resonator
22: opening
24: hollow portion
26: porous sound absorbing body

What is claimed is:

1. A box-shaped soundproof structure comprising:
a box at least a part of which is opened, and
a sound reduction structure including a resonator disposed in the box,
wherein the resonator includes a frame at least one surface of which is opened, and a membrane-like member disposed on an open surface of the frame,
the membrane-like member is a resonator that performs membrane vibration,
the membrane-like member is in contact only with the frame,
a normal incidence sound absorption coefficient in a high-order vibration mode is greater than a normal incidence sound absorption coefficient in a fundamental vibration mode of the membrane vibration of the resonator that performs the membrane vibration, and
an airborne sound generated from a sound source disposed in the box and emitted from an open surface of the box to the outside is reduced by the sound reduction structure.

2. The box-shaped soundproof structure according to claim 1,
wherein the frame has one surface as an open surface and the membrane-like member is disposed on the open surface to form a closed space surrounded by the frame and the membrane-like member.

3. The box-shaped soundproof structure according to claim 1,
wherein the resonator is formed by laminating two or more layers in total of at least one or more of a membrane-like member or a plate-shaped member having through holes, with a frame interposed therebetween.

4. The box-shaped soundproof structure according to claim 1,
wherein the sound source has at least one natural frequency of the sound source at which a sound volume is at a peak.

5. The box-shaped soundproof structure according to claim 4,
wherein a resonance frequency of the resonator is within a range of ±20% of the natural frequency of the sound source.

6. The box-shaped soundproof structure according to claim 4,
wherein the resonator is disposed on an extension of a direction of a maximum sound volume in a sound source radiation distribution in a natural frequency of the sound source.

7. The box-shaped soundproof structure according to claim 1,
wherein a resonance frequency of the resonator is within a range of ±20% of a resonance frequency of resonance occurring in the box.

8. The box-shaped soundproof structure according to claim 1,
wherein the resonator is disposed at a corner of the box.

9. The box-shaped soundproof structure according to claim 1,
wherein, in a case where a distance from any one open portion of the box to a farthest position in the box in a direction perpendicular to the open portion is defined as a box depth,
at least a part of the resonator is disposed at a position farther than a half the box depth from the open portion.

10. The box-shaped soundproof structure according to claim 1,
wherein a longest length of the inside of the box is longer than a half of a wavelength of a natural frequency of the sound source.

11. The box-shaped soundproof structure according to claim 1,
wherein an outer shape of the box is a rectangular parallelepiped shape whose one surface is opened.

12. The box-shaped soundproof structure according to claim 1,
wherein the box-shaped soundproof structure is attachable to and detachable from the sound source, and is disposed to surround the sound source.

13. The box-shaped soundproof structure according to claim 1,
wherein the sound source is at least one of an electric motor or an inverter.

14. A transportation apparatus comprising:
at least one of an electric motor or an inverter as a sound source; and
the box-shaped soundproof structure according to claim 1,
wherein at least one of the electric motor or the inverter is set as a sound reduction target, and the sound source as the sound reduction target is installed to be disposed in contact with the box or in the box.

15. The transportation apparatus according to claim 14, wherein the transportation apparatus is a vehicle.

16. The transportation apparatus according to claim 14, wherein the sound reduction structure of the box-shaped soundproof structure is disposed at a position intercepting a straight line connecting a position of the sound source and a position of a seat in the transportation apparatus.

\* \* \* \* \*